United States Patent [19]

Carmody et al.

[11] Patent Number: 5,344,164
[45] Date of Patent: Sep. 6, 1994

[54] MECHANICAL SEALS

[75] Inventors: Christopher J. Carmody, Conisbrough; Christopher J. Rea, Moorgate, both of England

[73] Assignee: AES Engineering Limited, South Yorkshire, England

[21] Appl. No.: 960,092

[22] Filed: Oct. 8, 1992

[30] Foreign Application Priority Data

Oct. 10, 1991 [GB] United Kingdom ............ 9121565.7

[51] Int. Cl.⁵ .................... F16J 15/34; F16J 15/54
[52] U.S. Cl. ............................ 277/81 R; 277/93 SD; 277/96.1
[58] Field of Search ............... 277/38, 39, 40, 41, 277/81 R, 82, 83, 85, 93 R, 93 SD, 96.1

[56] References Cited

U.S. PATENT DOCUMENTS

| | | | |
|---|---|---|---|
| 3,239,232 | 3/1966 | Andresen | 277/38 |
| 3,582,089 | 6/1971 | Amorese | 277/38 |
| 3,647,190 | 3/1972 | Iozzelli | 277/81 R X |
| 4,335,888 | 6/1982 | Ohba et al. | 277/81 R X |
| 4,434,986 | 3/1984 | Warner | 277/81 R X |
| 4,509,762 | 4/1985 | Garrett | 277/81 R |
| 4,639,000 | 1/1987 | Warner | 277/93 SD X |
| 4,890,851 | 1/1990 | Avard et al. | 277/81 R X |
| 4,971,337 | 11/1990 | Hufford | 277/93 SD X |
| 5,026,077 | 6/1991 | Warner | 277/81 R X |
| 5,188,377 | 2/1993 | Drumm | 277/81 R X |

FOREIGN PATENT DOCUMENTS

| | | |
|---|---|---|
| 0076169 | 4/1983 | European Pat. Off. ......... 277/81 R |
| 2097072 | 10/1982 | United Kingdom . |
| 2111139 | 6/1983 | United Kingdom . |
| 2123098 | 1/1984 | United Kingdom . |
| 2182730 | 5/1987 | United Kingdom . |
| 2211252 | 6/1989 | United Kingdom . |
| 2230828 | 10/1990 | United Kingdom . |

*Primary Examiner*—William A. Cuchlinski, Jr.
*Assistant Examiner*—John L. Beres
*Attorney, Agent, or Firm*—Edwin D. Schindler

[57] ABSTRACT

The invention provides a cartridge-mounted mechanical seal in which a set of bellows acts against the rotary component to urge its face into mating contact with the stationary component face, and wherein the stationary component is mounted in the seal so as to allow it a degree of pivotal movement, in use, relative to the stationary parts of an item of equipment in which the seal is used, about an axis perpendicular to the longitudinal axis of the seal, hence maintaining the stationary and rotary components substantially in alignment despite any out-of-squareness in the equipment. The invention also provides a self-aligning stationary unit which might be used in such a seal, in which unit a stationary seal face is pivotally mounted about one or more primary pivot pins set in a pivot ring, the pivot ring in turn being pivotally mounted about one or more secondary pivot pins set in a gland plate which, in use of a seal incorporating the unit in an item of equipment, will remain fixed in position relative to stationary parts of the equipment, the primary pivot pins being located in slots provided in the stationary seal face.

25 Claims, 19 Drawing Sheets

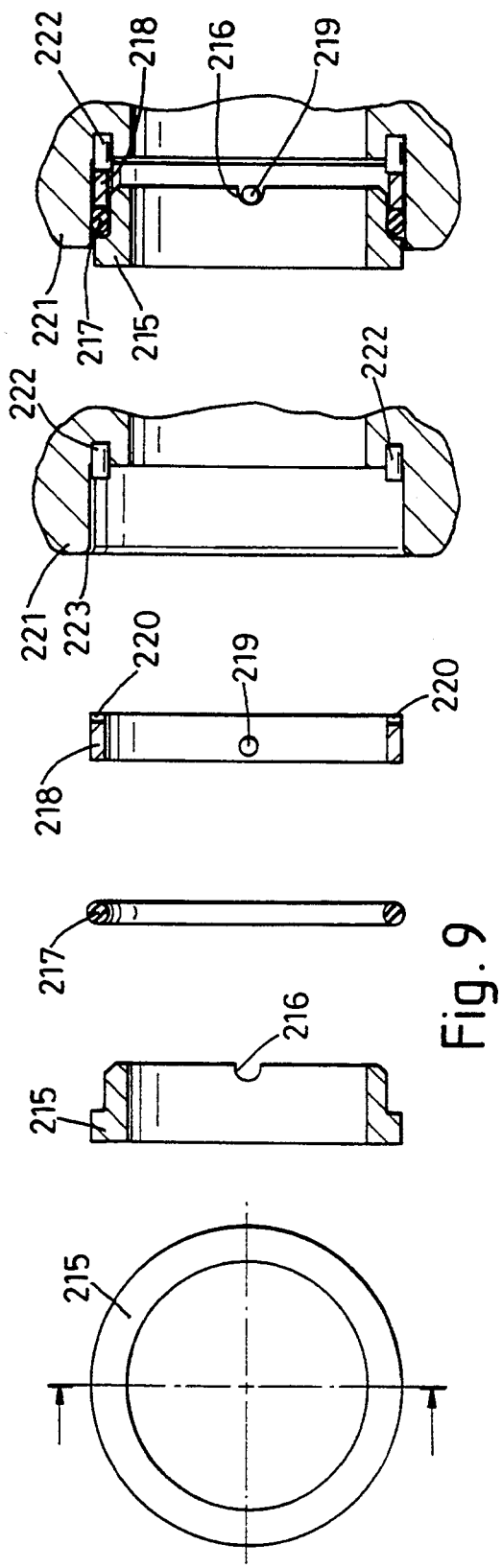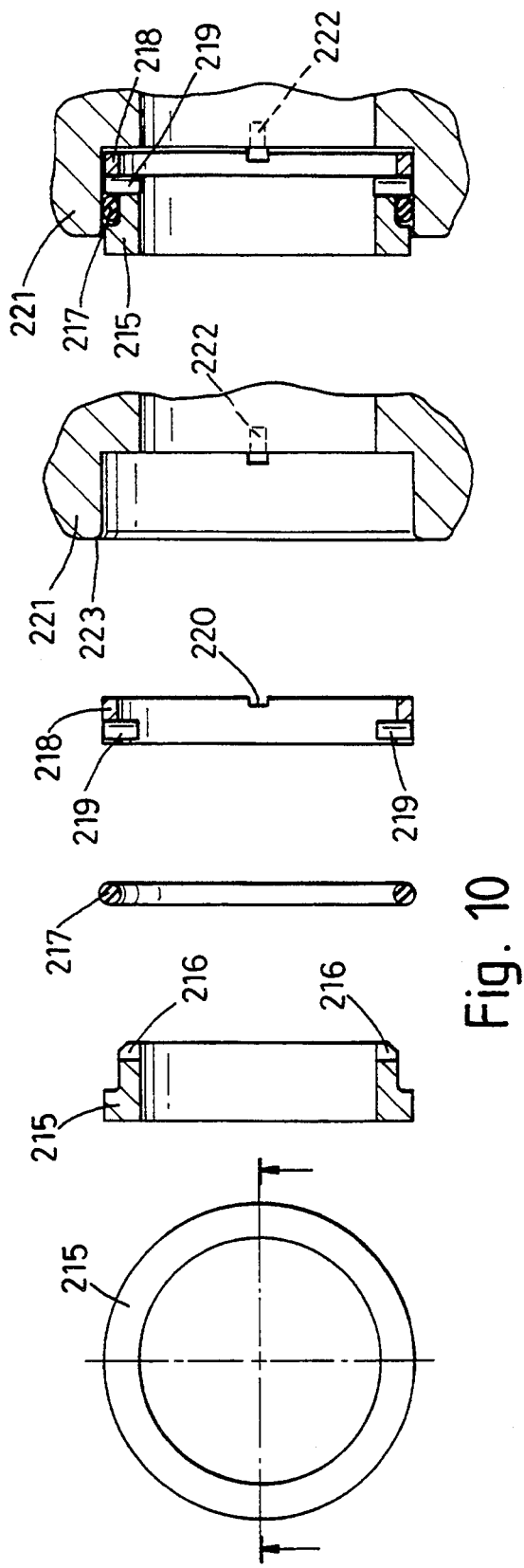

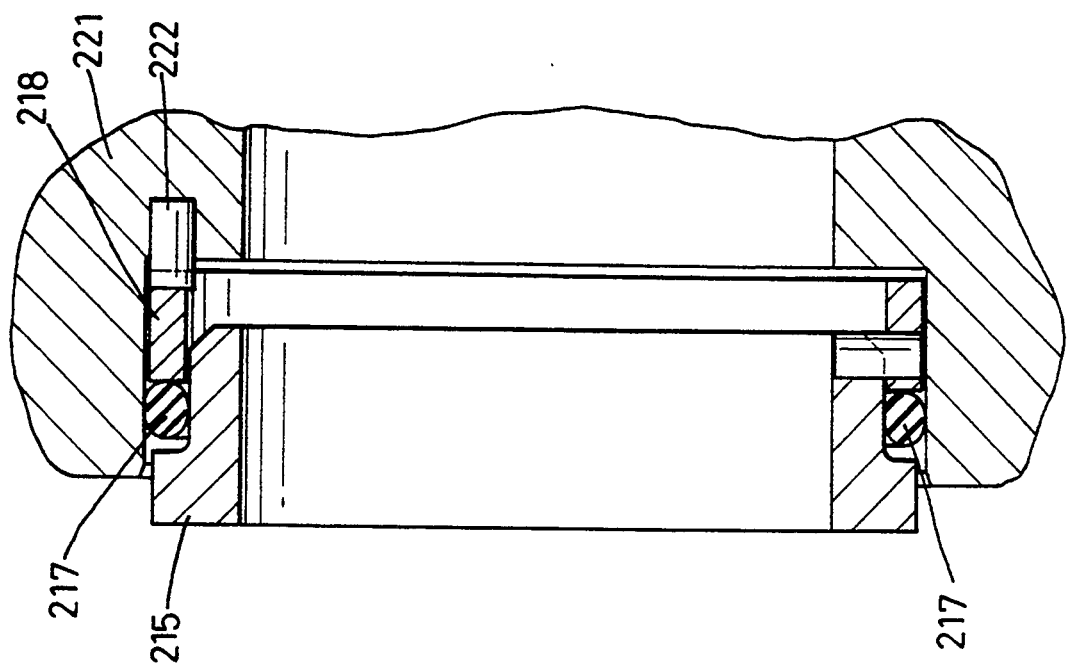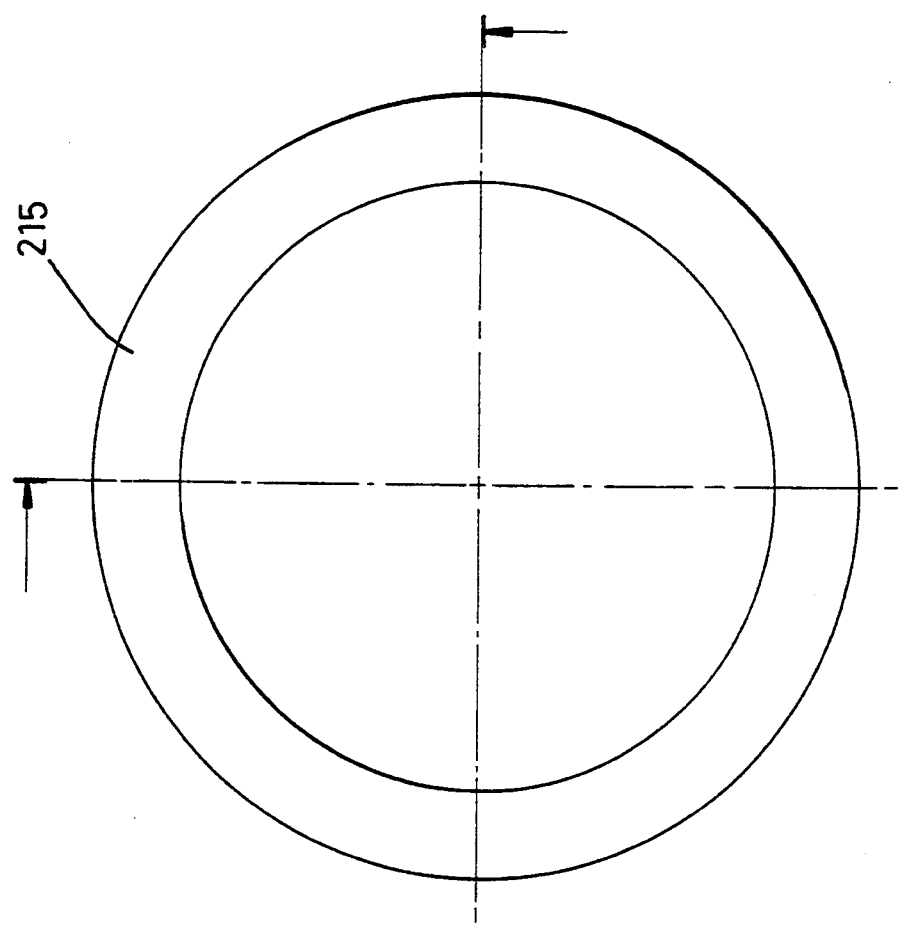
Fig. 13

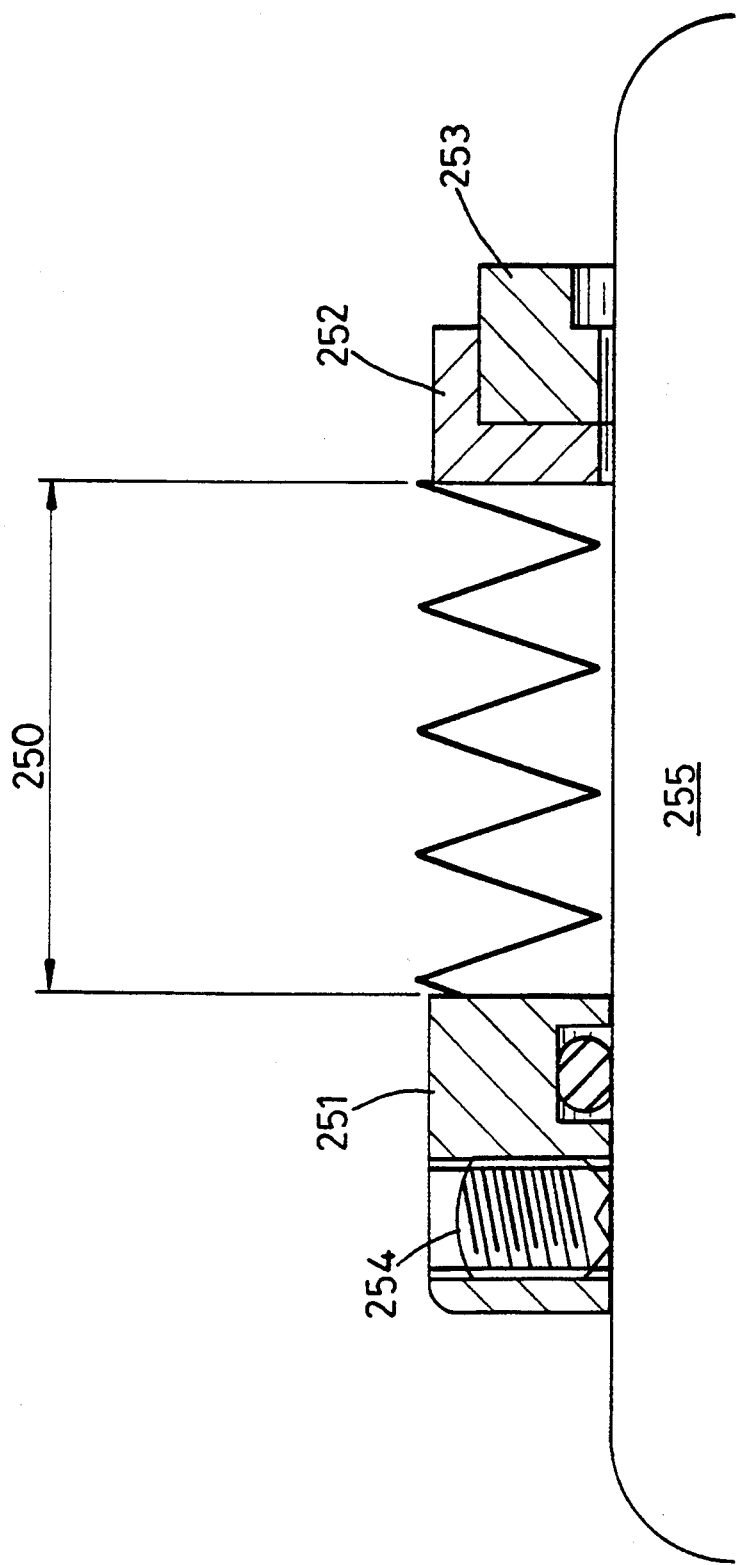

MECHANICAL SEALS

BACKGROUND OF THE INVENTION

1. Field of the Invention

This invention relates to mechanical seals, which are devices used for preventing fluid leakage from pumps, mixing vessels, gear boxes and other pieces of equipment where fluid is situated between stationary and rotating parts.

2. Background to the Invention

A mechanical seal is normally located in a seal cavity which is situated, for instance, where a rotating shaft enters the stationary part of the equipment. It typically comprises two parts, one termed the "rotary" which is fixed to the rotating shaft, and the other termed the "stationary" which is fixed to the body of the equipment.

Typically, mechanical seals consist of a number of components: as a result, it is difficult and time consuming to instal them properly. Problems are encountered in setting the seals to their correct working lengths and in protecting the seal components (to avoid soiling and damage) during assembly. As a result, so-called cartridge-mounted mechanical seals, which are factory-assembled to form pre-set units and do not require installation measurments to be taken on fitting, have become increasingly popular.

Typically, cartridge-mounted mechanical seals include a stainless steel sleeve which forms an inner cylindrical member which, in use, surrounds the rotating shaft. At one end of the sleeve, there is provided a groove to accommodate an 'O' ring between the sleeve and the shaft.

A cartridge-mounted mechanical seal has rotary and stationary components which contact one another at their respective, adjacent, faces. There is a need to maintain good mating contact between the two faces to ensure efficient operation of the seal, and thus often some form of biassing means is incorporated in the seal, either a rotary biassing means to urge the rotary component face into mating contact with the stationary component face, or a stationary biassing means, acting against the stationary face to urge it into contact with the rotary face.

The biassing means may, for example, take the form of a spring or springs, usually located in one or more longitudinal bores provided between the end of the seal sleeve and the rotary or stationary component of the seal, which springs act against the rotary or stationary component respectively to urge it in a direction towards the other component.

Alternatively, bellows are sometimes used as a biassing means. These are typically made from a resilient metal, and usually supplied in the form of a bellows unit for securing to a seal sleeve during assembly of the seal. Apart from helping to maintain seal face contact in the seal, the bellows also effectively function as a secondary seal, in addition to the seal faces themselves against which they act, removing the need for additional secondary sealing elements such as 'O'-rings.

One problem which can arise in the use of mechanical seals is that out-of-alignment between parts of the equipment in which a seal is used can disrupt contact between the stationary and rotary component faces.

Most mechanical seals are dimensionally suitable for up-grading pumps with packed glands into effectively sealed units, without equipment modifications. However, most seal designs do not account for the fact that pumps were often originally designed for use with compression-type gland packings. The stuffing box face of a packed gland pump does not have to be perpendicular to the shaft centre line for the compression packing to work. Thus, in an effort to make savings in production costs, some pump manufacturers do not finish machine the stuffing box face, with the result that the face cannot be square to the shaft. Even on rotating equipment which is designed to take mechanical seals, a lesser degree of out-of-squareness can still exist due to component manufacturing and assembly tolerances.

When a seal is fitted to a pump without this out-of-squareness being rectified, then angular mis-alignment will exist between the rotary and stationary seal components.

Where angular mis-alignment exists, the robustness of the rotary seal floating member/parts determines whether the rotary unit of the seal aligns to the rotating equipment shaft or to the stationary seal component. If the rotary component aligns to the shaft, then a gap will open up between the rotary and stationary seal faces due to the angular mis-alignment. Alternatively, the rotary component can align to the stationary seal face, which causes fretting underneath the dynamic 'O' ring (between the rotary component and the seal sleeve on which it is mounted) due to the 'O' ring moving against the seal sleeve. It also causes fatigue of springs acting as rotary biassing means, due to changes in the spring operating length which are required to keep the rotary and stationary component faces in contact with each other. Very often, the results of angular mis-alignment are a mixture of these two situations, which combine to considerably shorten the seal life.

In rotary metal bellows seals, where a bellows unit acts as biassing means against the rotary seal component, fatigue is a particular problem if the metal bellows are of a welded construction. Welded structures are particularly prone to cracking when fatigued; in the case of welded metal bellows this means that irreparable damage is caused to the seal unit.

A so-called self-aligning stationary is thus incorporated in many seals to compensate for the angular mis-alignment which can exist between equipment shafts and bodies. A self-aligning stationary is a stationary component which is pivotally mounted in a seal gland plate so as to allow a degree of pivotal movement, when the seal is in use, of the stationary component relative to the stationary parts of an item of equipment in which the seal is used, about an axis perpendicular to the longitudinal axis of the seal, and hence maintain the stationary and rotary components of the seal substantially in alignment despite any out-of-squareness in the equipment.

Such a "self-aligning stationary" is capable of aligning to the rotary component of the seal, thus compensating for any out-of-squareness (i.e. between rotating and stationary parts) in the equipment in which the seal is used. Whilst the rotary component of the seal, in use, rotates with the rotating parts of the equipment, the stationary component of the seal is not completely fixed relative to the stationary parts of the equipment, and can thus remain aligned to the rotary component of the seal (maintaining contact between the stationary and rotary seal faces) whatever the relative positions of rotating and stationary parts of the equipment.

The stationary component (seal face) will typically be mounted about one or more primary pivot pins set in a pivot ring which is in turn mounted about secondary pivot pins set in an integral gland plate included in the seal, or in another part of the seal which, in use, remains fixed in position relative to stationary parts of the equipment.

Various self-aligning stationarys of the type referred to are already known, one in particular (although not one necessarily suitable for use with all types of seal faces) having been described in our European Patent No. EP-0,098,747B.

The use of biasing means such as springs or bellows, and the alternative of a self-aligning stationary as a means of ensuring constant contact between rotary and its stationary component faces, is often not sufficient on its own to maintain the contact needed. It has often proved impossible to compensate completely for out-of-squareness arising between the two components in use.

SUMMARY OF THE INVENTION

According to the present invention, there is provided a cartridge-mounted mechanical seal comprising a sleeve on which are mounted a rotary and a stationary component, having adjacent faces, and a set of bellows acting against the rotary component to urge the rotary component face into mating contact with the stationary component face, wherein the stationary component of the seal is pivotally mounted in the seal so as to allow a degree of pivotal movement, when the seal is in use, of the stationary component relative to the stationary parts of an item of equipment in which the seal is used, about an axis perpendicular to the longitudinal axis of the seal, and hence maintain the stationary and rotary components of the seal substantially in alignment despite any out-of-squareness in the equipment.

The invention thus combines a rotary biassing means (bellows) with a self-aligning stationary, so that the rotary and stationary component faces are urged into, and maintained in, complete mating contact by two distinct means. The bellows urge the rotary component face into contact with the stationary component face, ensuring that fluctuations in pressure of the liquid under seal, and other factors which might otherwise disturb the alignment of the faces, are automatically compensated for. In addition, any out-of-squareness in equipment in which the seal is used, which might otherwise force the stationary and rotary component out of alignment, can also be compensated for. The seal can thus function more efficiently, and for longer, than those conventionally used, in which there is less certainty that the two seal faces will remain in contact.

The convolutions of the bellows may be of any suitable shape, depending on the levels of flexibility and strength required of them. For instance, the bellows may have a repeating V profile, a repeating U profile, etc. The bellows may thus be of a welded or a corrugated construction.

The bellows may be made from metal, preferably from a metal or metal alloy having a relatively high chemical resistance. Stainless steel is a preferred material, being resilient and also corrosion-resistant. The core of the bellows is typically welded to the rotary component of the seal, or to a holder in which the component is mounted.

At its end remote from the rotary component of the seal, the core of the bellows may be welded directly to the seal sleeve at an appropriate point towards the inside (i.e. inside the product being sealed) end. Alternatively, the bellows may form part of a bellows unit comprising a bellows holder to which the bellows core is welded, the holder in turn being secured to the seal sleeve, typically by means of a grub screw or other similar fastening means.

The seal may comprise more than one set of bellows, so as to provide extra resistance against pressure in use, and so as to provide a greater force acting to urge the rotary component face into contact with the stationary face.

The stationary component will typically be mounted about one or more primary pivot pins, set in a pivot ring which is in turn mounted about one or more secondary pivot pins set in an integral gland plate included in the seal, or in another fixed part of the seal which, in use, remains fixed in position relative to stationary parts of the equipment, the arrangement allowing a degree of pivotal movement of the stationary component relative to the pivot ring about the primary pivot pin or pins, and a degree of pivotal movement of the pivot ring, relative to the fixed part of the seal, about the secondary pivot pin or pins.

One type of self-aligning stationary which has this structure is already known, having been described in our European Patent No. EP-0,098,747B. The teachings of that document, regarding seals with self-aligning stationary faces, are intended to be incorporated by reference in the present document, and any seal described in EP-0,098,747B, additionally comprising a set of bellows acting to urge the rotary component face into mating contact with the stationary component face, falls within the scope of the present invention.

However, in a seal in accordance with the present invention, the primary pivot pins are preferably located in slots provided in the stationary component. The primary pivot pins preferably enter these slots in a radial direction in use, at least part of the pivot ring encircling at least part of the outside diameter of the stationary component.

The arrangement of the stationary component and pivot ring, relative to the fixed part the seal in which the secondary pivot pins are set, is preferably such that an O-ring or similar sealing element may be accommodated, and held in position, in a cavity defined by the stationary component, the pivot ring and the fixed part of the seal, so that the sealing element acts, in use, to seal the join between the stationary component and the fixed part of the seal.

The seal sleeve may be made of any suitable material, for instance stainless steel, or a material having a relatively high chemical resistance such as a special alloy, according to the conditions under which the seal is to be used. The seal faces may be made from any material generally regarded as suitable for seal faces, such as a metal, a ceramic material, tungsten carbide, etc. The stationary component face is however preferably made from a ceramic material, more preferably silicon carbide, as is the rotary component face.

The seal will typically also comprise an integral gland plate for connection to the casing of equipment in which the seal is to be used.

A seal in accordance with the invention may also form part of a double cartridge-mounted mechanical seal having both inboard and outboard rotary and stationary components.

According to another aspect of the present invention there is provided a self-aligning-stationary unit for use in a cartridge-mounted mechanical seal, the unit comprising a stationary seal face pivotally mounted about one or more primary pivot pins set in a pivot ring, the pivot ring in turn being pivotally mounted about one or more secondary pivot pins set in a gland plate which, in use of a seal incorporating the unit in an item of equipment, will remain fixed in position relative to stationary parts of the equipment, the primary pivot pins being located in slots provided in the stationary seal face.

The primary pivot pins preferably enter the seal face slots in a radial direction in use, at least part of the pivot ring encircling at least part of the outside diameter of the stationary seal face.

The unit preferably comprises two primary pivot pins, spaced by 180° radially from one another, and preferably two secondary pivot pins, similarly spaced. Each of the two secondary pivot pins is preferably spaced by 90° radially from one of the respective primary pivot pins, in use.

The arrangement of the stationary seal face and pivot ring, relative to the gland plate, is preferably such that an O-ring or similar sealing element may be accommodated, and held in position, in a cavity defined by the stationary seal face, the pivot ring and the gland plate, so that the sealing element acts, in use, to seal the join between the stationary seal face and the gland plate.

The stationary seal face of the unit is preferably made, at least partly but ideally entirely, from a ceramic material such as silicon carbide, as is the rotary seal face.

The invention also provides a cartridge-mounted mechanical seal comprising a sleeve on which are mounted a rotary and a stationary component, having adjacent faces, wherein the stationary component of the seal forms the stationary seal face of a self-aligning stationary unit in accordance with the invention, the unit being mounted in the seal for use in maintaining the stationary and rotary components of the seal substantially in alignment despite any out-of-squareness in an item of equipment in which the seal is used.

BRIEF DESCRIPTION OF THE INVENTION

The invention will now be further described, by way of illustration only, with reference to the accompanying drawings, in which:

FIGS. 9 and 10 show in more detail the self-aligning stationary component of the seal shown in FIG. 8;

Figure 1:
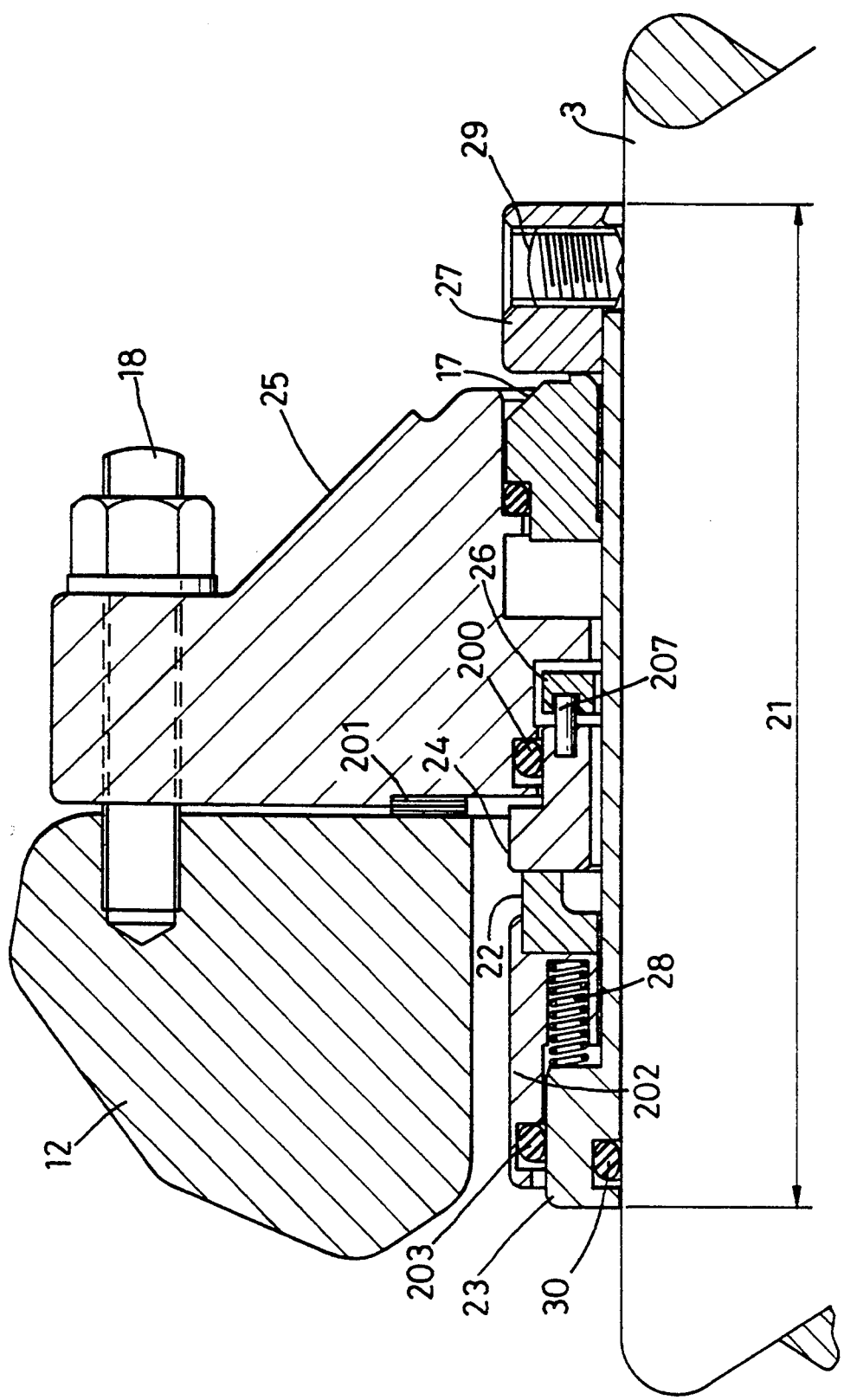
FIGS. 1 and 2 illustrate cartridge-mounted mechanical seals.

FIG. 13 also shows the self-aligning stationary component of FIGS. 9 and 10;

FIGS. 14–19 show examples of cartridge seals in accordance with the invention;

FIG. 20 shows a bellows unit for use in a seal in accordance with the invention; and FIGS. 21–24 show various designs of face end which may be used with a bellows core in a seal in accordance with the invention.

DETAILED DESCRIPTION OF THE DRAWING FIGURES AND PREFERRED EMBODIMENTS

Figure 2:
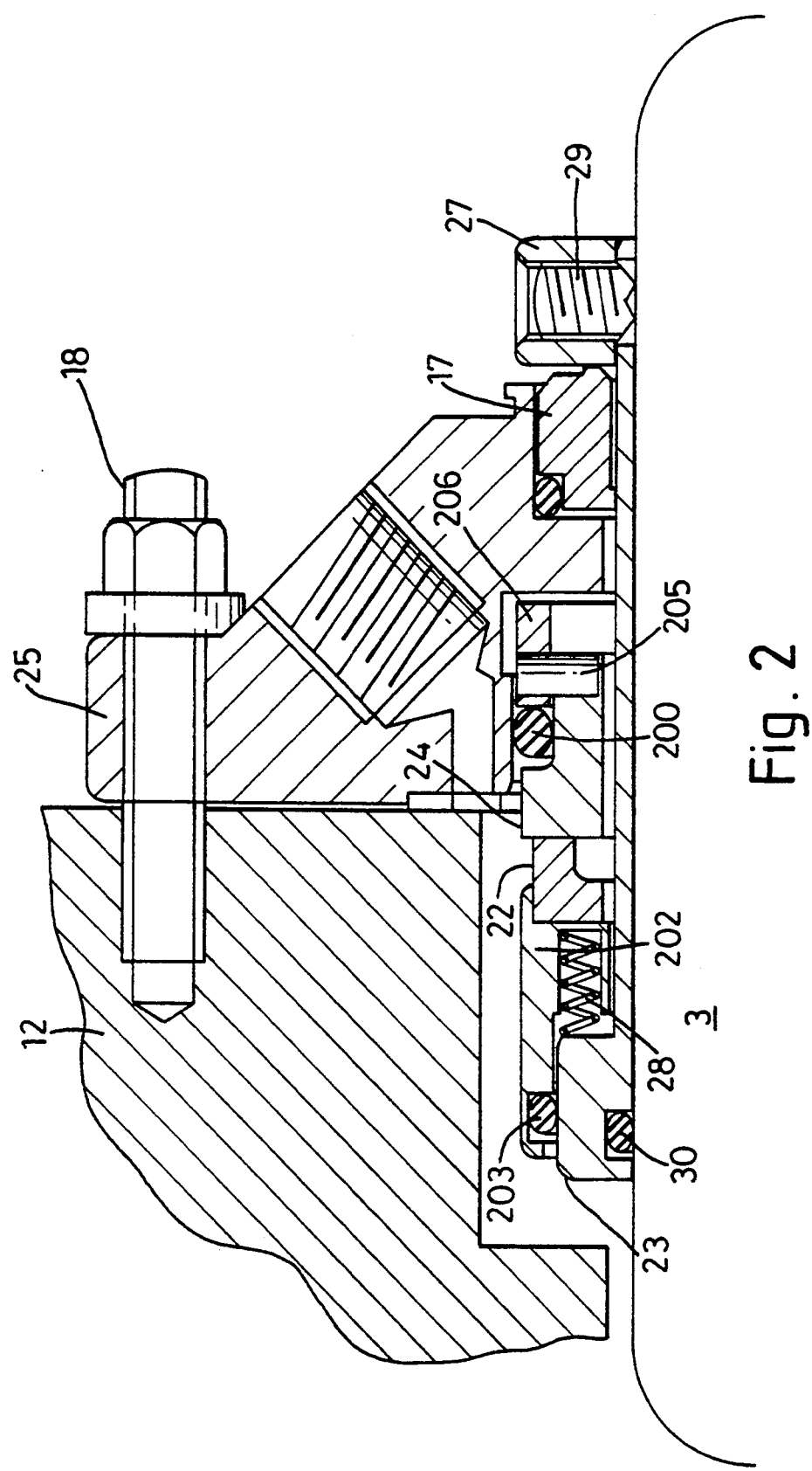

Although designs can vary, two types of cartridge-mounted mechanical seal are shown in FIGS. 1 and 2. In FIG. 1, the seal 21 includes a cartridge or sleeve 23 on which all the other components of the seal are mounted. The sleeve is mounted around a rotatable shaft 3 in the equipment, for example a pump, being sealed.

The seal includes rotary components, which rotate with shaft 3, and stationary components, fixed relative to the equipment casing 12. Rotary seal face 22 is in contact with stationary seal face 24, which latter is mounted about primary pivot pins 207 set in pivot ring 26. There are two such pivot pins, radially spaced from each other by 180° about shaft 3. Two secondary pivot pins (not seen in FIG. 1), each spaced at 90° radially from one of the primary pins 207, mount the pivot ring 26 into gland plate 25. Pivotal movement of seal face 24 relative to pivot ring 26 about primary pivot pins 207, and of the pivot ring relative to the gland plate about the secondary pins, together ensure alignment of the stationary seal face 24 with rotary seal face 22 at all times (i.e. the seal includes a so-called self-aligning stationary). This type of self-aligning-stationary is known as the "USL" type. Primary pivot pins 207 enter the seal face 24 in an axial direction, and are mounted in bores provided in the rear of the seal face. The pivot ring 26 is displaced axially from the seal face 24 along the shaft 3.

Springs 28, located in radially spaced, longitudinal bores provided in the rotary seal face holder 202, also assist in maintaining the two faces 22 and 24 in contact with one another by urging face 22 in a direction towards 24 (i.e. by acting as rotary biassing means).

The seal has its own gland plate 25, which is secured to the casing 12 of the equipment in which the seal is being used by means of gland bolts such as 18. The clamping arrangement, for clamping the seal in place in the equipment, includes clamp ring 27 and drive screw 29, and is situated on the outside of the seal (i.e. the side remote from the fluid being sealed) for easy access. Shaft O-ring seal 30 sits between sleeve 23 and rotatable shaft 3 around which the sleeve is mounted, in a groove provided in the sleeve.

The seal 21 is also provided with an in-built setting device 17, a stationary component O-ring seal 200, a gland gasket 201, a holder 202 for the rotary seal face and a rotary dynamic O-ring seal 203 between the rotary holder and the sleeve 23.

The seal shown in FIG. 2 is in many respects similar to that shown in FIG. 1, and like parts are given the same reference numbers. However, this seal incorporates a different type of self-aligning-stationary component, known as the "USI" type. Stationary seal face 24 is mounted about two primary pivot pins such as 205, radially spaced from each other by 180° about shaft 3. Pins 205 are set in a pivot ring 206. The clearances involved are such that stationary face 24 is allowed a degree of pivotal movement about pins 205, about an axis perpendicular to the axis of shaft 3. Pivot ring 206 is itself mounted about secondary pivot pins (not shown in FIG. 2) set in the gland plate 25, each spaced at 90° radially from one of the primary pins 205. These secondary pins allow further pivotal movement, of the pivot ring relative to the gland plate.

Primary pivot pins 205 are mounted in slots provided at the end of seal face 24, and enter these slots in a radial direction. The pivot ring 206 partially encircles one end of the stationary seal face.

Figure 3:
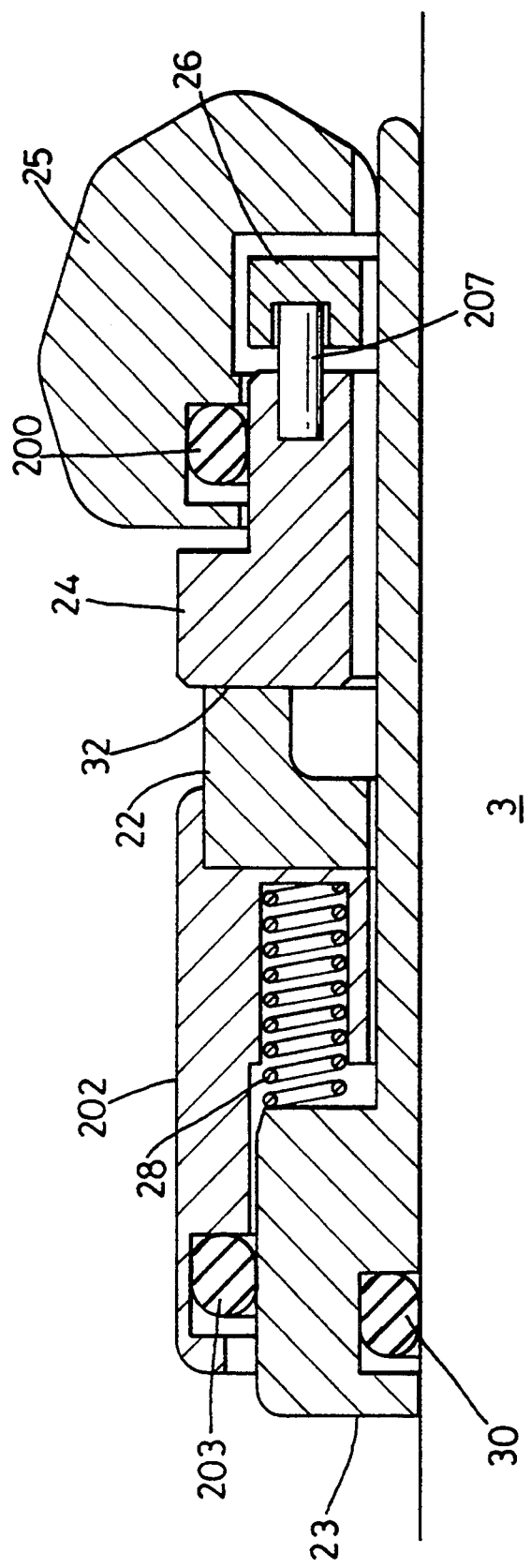
FIGS. 3 and 4 show the seal-face contact in the cartridge-mounted seals of FIGS. 1 and 2 respectively.
Figure 4:
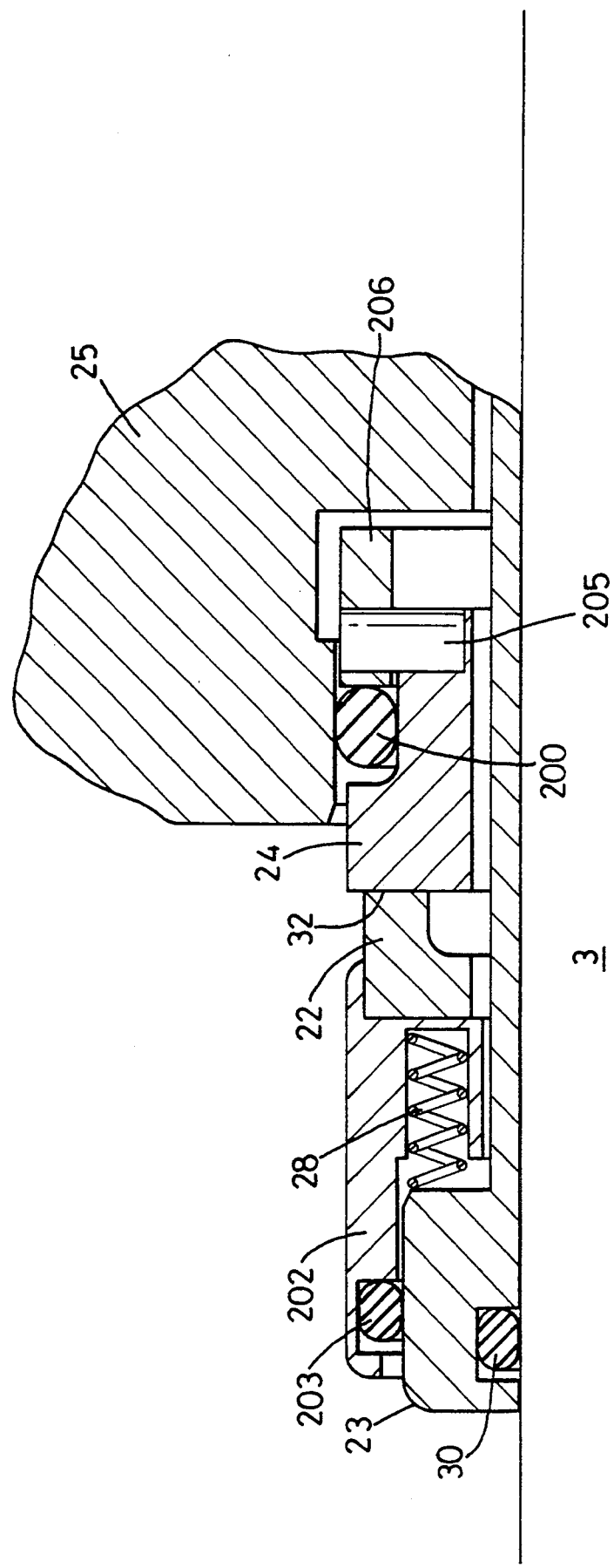
Figure 5:
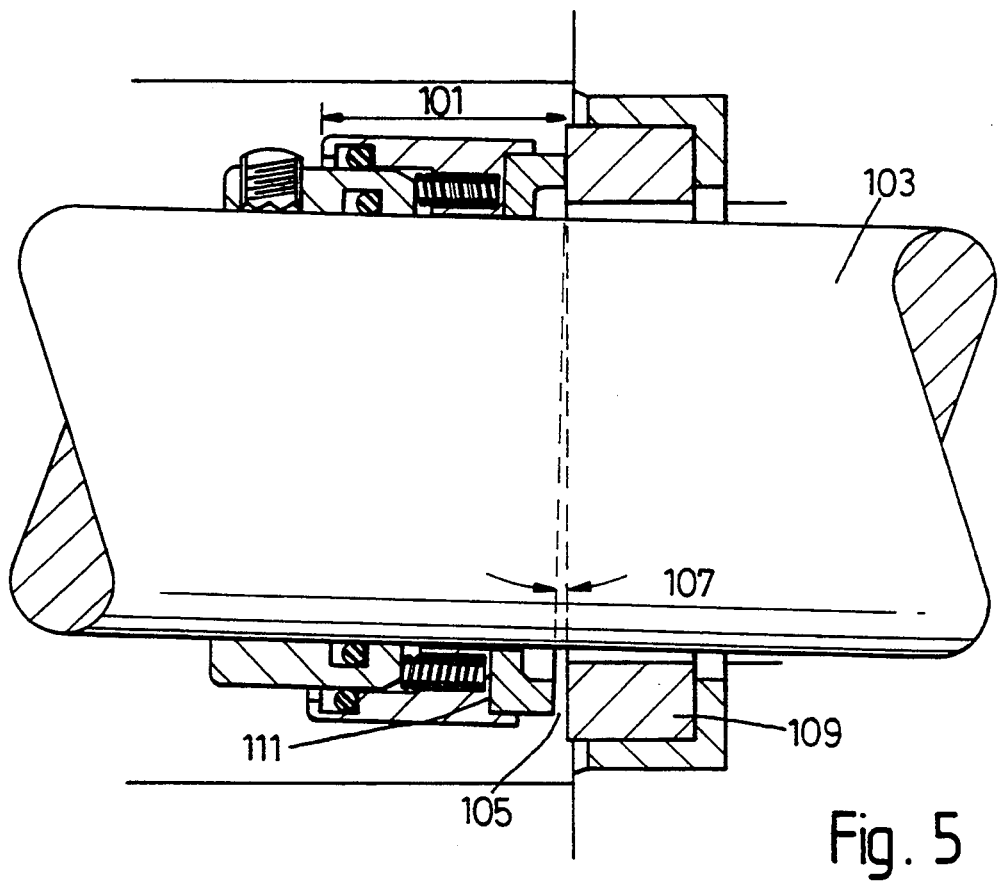
FIGS. 5 and 6 illustrate the mis-alignment which can occur when a mechanical seal is fitted in a pump or similar equipment.
Figure 6:
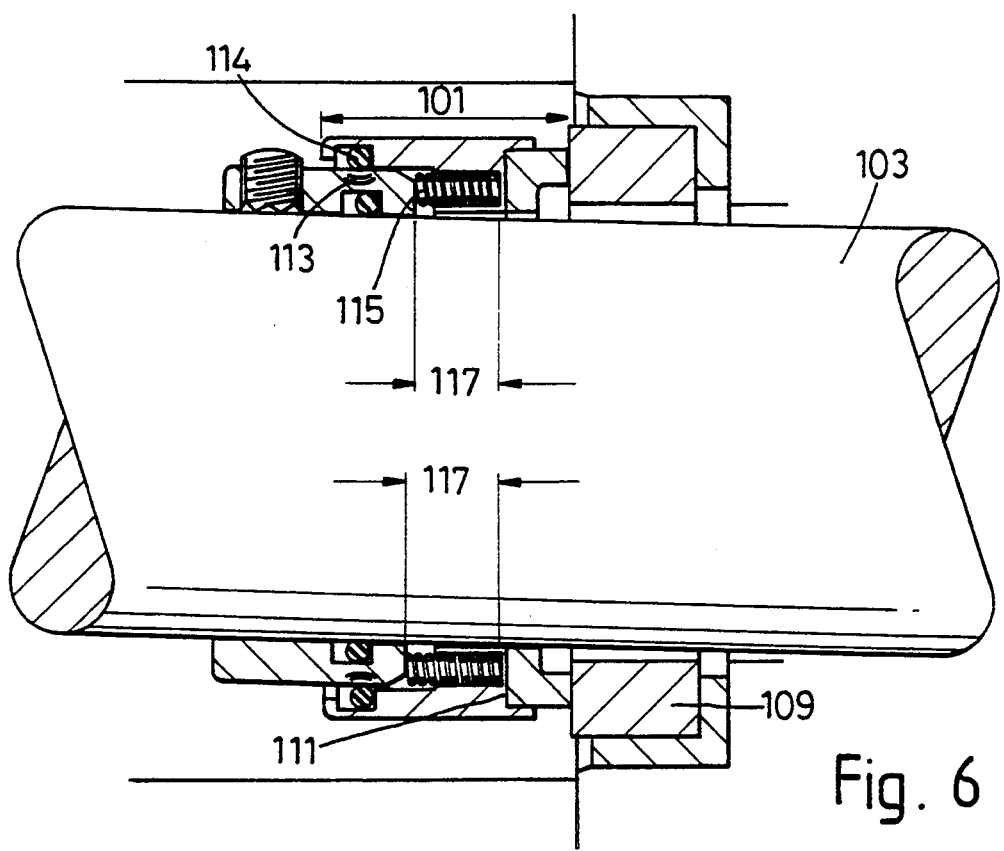

FIGS. 3 and 4 show in more detail the seal-face contact in the seals of FIGS. 1 and 2 respectively. It can be seen how, in each case, springs 28 are used to provide a force, against the rotary components of the seal, to maintain even contact between the faces 22 and 24 (at the interface labelled 32 in FIGS. 3 and 4).

The principle of the "self-aligning stationary", included in a cartridge seal in accordance with the invention, is illustrated by means of FIGS. 5–8.

Most mechanical seals are dimensionally suitable for upgrading pumps with packed glands into effectively sealed units, without equipment modifications. However, most seal designs do not account for the fact that pumps were often originally designed for use with compression-type gland packings. The stuffing box face of a packed gland pump does not have to be perpendicular to the shaft centre line for the compression packing to work. Thus, in an effort to make savings in production costs, some pump manufacturers do not finish machine the stuffing box face, with the result that the face cannot be square to the shaft. Even on rotating equipment which is designed to take mechanical seals, a lesser degree of out-of-squareness can still exist due to component manufacturing and assembly tolerances.

When a seal is fitted to a pump without this out-of-squareness being rectified, then angular mis-alignment will exist between the rotary and stationary seal components.

Where angular mis-alignment exists, the robustness of the rotary seal floating member/parts determines whether the rotary unit of the seal aligns to the rotating equipment shaft or to the stationary seal component. If the rotary component 101 aligns to the shaft 103, then a gap 105 will open up between the rotary 111 and stationary 109 seal faces (see FIG. 5) due to the angular mis-alignment 107. Alternatively, the rotary component can align to the stationary seal face 109 which causes fretting (113) underneath the dynamic 'O' ring 114 due to the 'O' ring moving against the seal sleeve. It also causes fatigue of springs 115 due to the changes in spring operating length which are required to keep the faces 109 and 111 in contact with each other (see FIG. 6). Very often, the results of angular mis-alignment are a mixture of the situations shown in FIGS. 5 and 6, which combine to considerably shorten the seal life.

Figure 7:
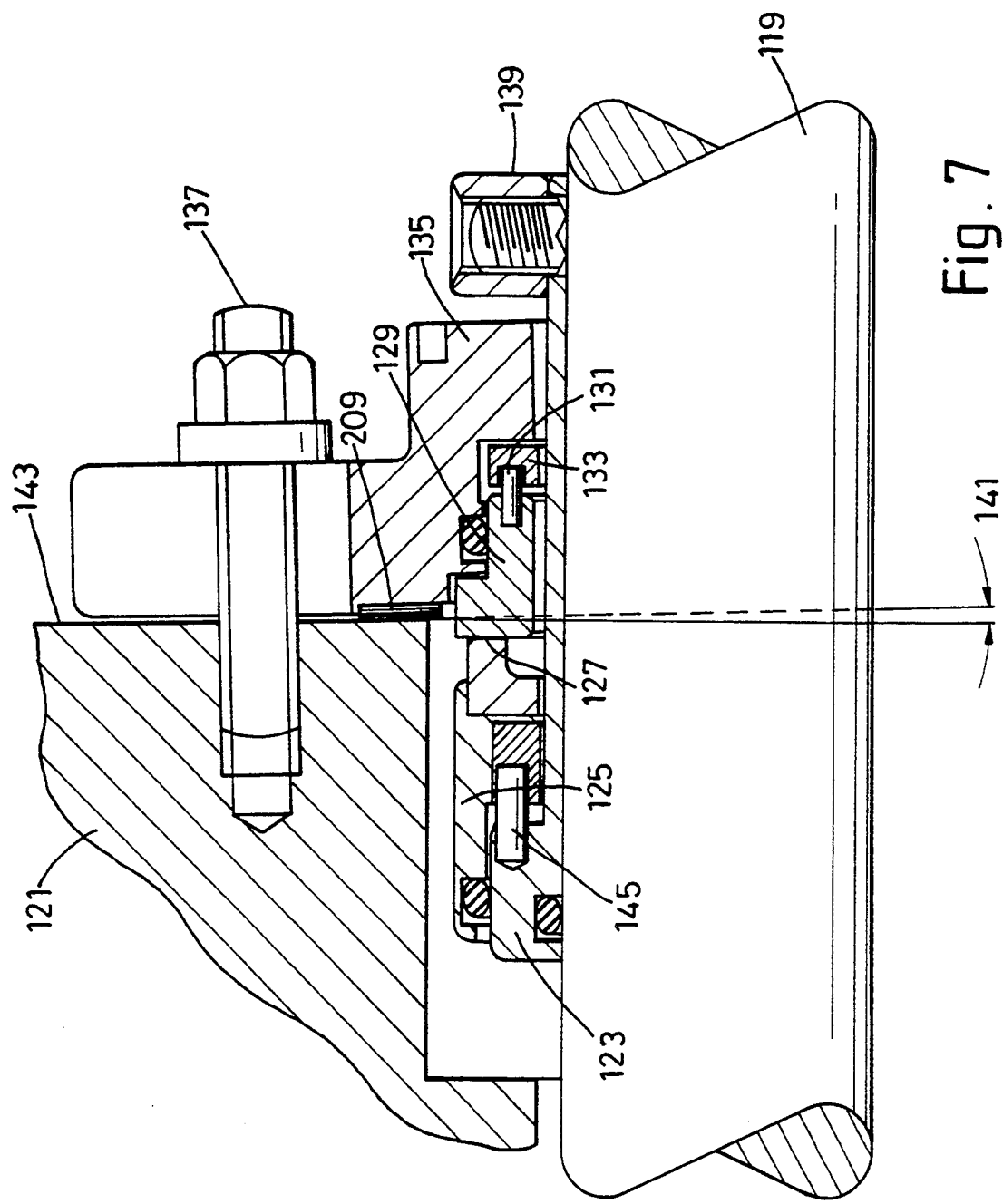
FIG. 7 and 8 show cartridge seals incorporating self-aligning stationary components.
Figure 8:
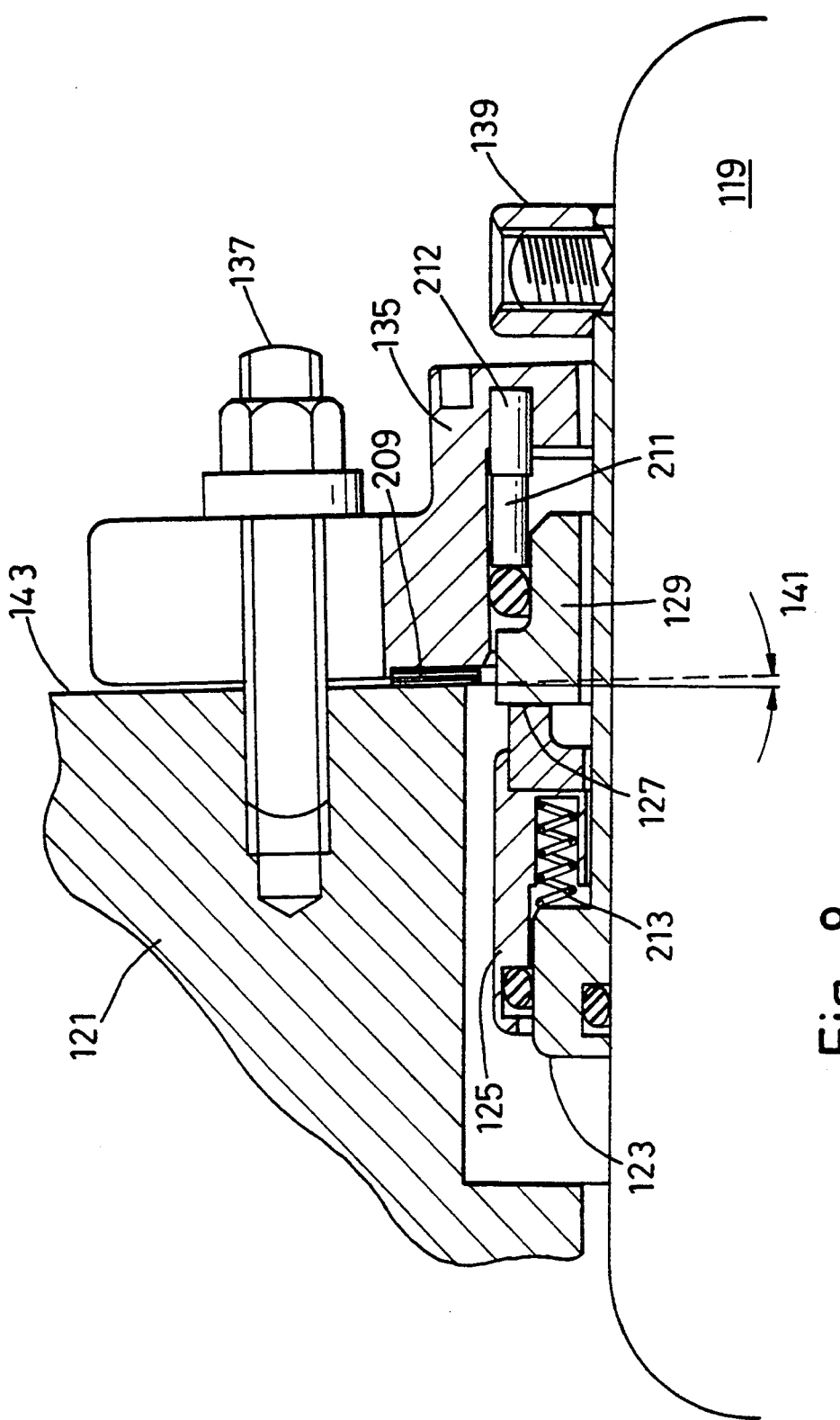

A self-aligning stationary, such as that in the cartridge seals shown in FIGS. 7 and 8, compensates for the angular mis-alignment which can exist between equipment shafts and bodies. In FIG. 7 (seal incorporating a self-aligning-stationary of the "USL" type), 119 is the equipment (e.g. pump) shaft and 121 its casing. The seal comprises a sleeve or cartridge 123, and a rotary unit 125 which has rotary face 127 abutting stationary face 129. The stationary face is mounted about primary pivot pins 131 set in pivot ring 133, which in turn is mounted about secondary pivot pins (not seen) set in gland plate 135. The stationary face is allowed a degree of pivotal movement about primary pivot pins 131, and the pivot ring 133 is in turn allowed pivotal movement about the secondary pins. The net result is that the stationary face is allowed to move as though part of a universal joint, relative to stationary parts of the equipment (e.g. casing 121) and of the seal (e.g. gland plate 135). Face 129 can thus "self-align" to rotary face 127, compensating for any out-of-squareness in the equipment in which the seal is mounted, by allowing the rotary unit 125 to be aligned to both shaft 119 and stationary face 129 simultaneously.

135 is the gland plate of the seal; 137 a gland bolt securing it to casing 121; 139 the clamp ring for securing the seal to shaft 119; 145 a drive pin for the rotary unit 125; and 141 the angular mis-alignment due to the stuffing box face 143 of the equipment 121 being out-of-square to the shaft 119. 209 is a gland gasket.

The seal of FIG. 8 incorporates a self-aligning stationary of the "USI" type. In all other respects, it is the same as the seal shown in FIG. 7, and the same reference numerals have been used for like parts. Stationary seal face 129 is mounted about primary pivot pins (not seen) set in pivot ring 211, which in turn is mounted about two secondary pivot pins such as 212 set in gland plate 135. This allows the stationary face to pivot about axes perpendicular to the axis of equipment shaft 119, and thus remain aligned to rotary face 127 whatever the angular mis-alignment 141 in the equipment in which the seal is mounted.

It should be noted that the self-aligning-stationary component seen in FIG. 8 is essentially the same as that shown in the seal of FIG. 2, although the sectional view shown in FIG. 8 is taken at 90° to that in FIG. 2.

Note also that the seal shown in FIG. 8 is shown with biassing springs 213, also acting to urge the rotary seal face 127 into constant mating contact with the stationary face 129.

The self-aligning-stationary component illustrated in FIG. 8 is shown in more detail in FIGS. 9 and 10, which show in cross-section the constituent parts of the component. FIG. 9 is a vertical section taken through the component, and FIG. 10 a horizontal section.

On the left-hand-side of each of FIGS. 9 and 10 there is shown a front view of a stationary seal face 215 forming part of the component. Moving from left to right, there are then shown:

a) cross-sections through the seal face 215, showing pivot pin slots 216 in the rear of the face;
b) O-ring seal 217 (also in cross-section);
c) cross-sections through pivot ring 218, which carries primary pivot pins 219 radially spaced by 180° from each other, and has slots 220 in its rear face, each spaced 90° radially from one of pins 219;
d) cross-sections of gland plate 221 of a seal, which carries secondary pivot pins 222 and has a chamfered front face 223 to accommodate seal face 215; and
e) cross-sections of the parts of the component when assembled.

In (e), it can be seen that primary pins 219 locate in slots 216 in the seal face, and secondary pivot pins 222 in slots 220 in the pivot ring 218. A certain amount of clearance is allowed between the rear of the pivot ring 218 and gland plate 221, which helps to make pivotal movement of the pivot ring and seal face possible.

FIGS. 9 and 10 show that the USI self-aligning stationary unit comprises four main components:

1. The seal face 215
2. An elastomeric 'O' ring 217.
3. A pivot ring assembly 218.
4. A gland assembly 221.

The seal face 215 has an inside diameter with sufficient working clearance over a shaft (or cartridge sleeve) and an outside diameter sized to ensure full tracking against a rotary seal face but with sufficient working clearance to allow it to function in a standard sized seal cavity.

The other (shoulder) diameter of the seal face is manufactured to accept an 'O' ring type sealing device, the size of which usually conforms to a recognised standard such as BS1806. Two slots 216 are provided at the smaller end of the seal between the shoulder and inside diameter (is, the back face). Typically the slots have one end open and the other end rounded. Dimensionally they are produced to accept round pins and be spaced 180° apart.

The seal face 215 also has three surfaces: a front face (between the inside and outside diameter); a back face (between the shoulder and inside diameter) into which the slots are positioned; and a shoulder face (between the outside and shoulder diameter). The front face is normally lapped and polished to a high degree of accuracy; the shoulder face is machined parallel to the front face and also provides enough clearance for the 'O' ring 217 to move. The back face needs to be distanced away from the front and shoulder faces sufficient to allow the 'O' ring movement (as previously stated) and to allow sufficient space for the pivot ring 218 and pivot ring pins 219 to be located.

The pivot ring assembly comprises a solid annular ring, usually made from 316 stainless steel, which has two pins 219, in a fixed position, that extend radially inwards and locate into the seal face slots 216. The pins are positioned 180° apart in close proximity to the front face of the ring. The solid section of the ring has two slots 220 in the back face, usually rectangular, which are spaced 180° apart but at 90° to the pins previously mentioned. The slots have to match up with two pins 222 which protrude out of a shouldered face on the gland 221.

The pivot ring 218 also has inside and outside diameters which have to be sufficient to provide working clearances for the seal face shoulder diameter and gland internal sealing diameter.

The gland plate 221 has an internal sealing diameter which is nominally sized to act as a bore suitable for sealing the 'O' ring 217. The front of the gland usually has a chamfer to assist in fitting this 'O' ring. The gland also has a shoulder face into which two protruding pins 222 are fitted (in an axial plane).

The pins 222 are spaced 180° apart and located into two slots 220 in the rear face of the pivot ring 218. The minor diameter of the gland has to be large enough to provide adequate running clearance for a rotating shaft in use, but otherwise has no effect on self aligning operation.

The pivot ring slot depth and gland pin (222) protrusion is such that some clearance exists between the back face of the pivot ring and the shouldered face of the gland. This clearance space permits the pivot ring to displace in an angular manner, about the axis of the gland pins 222. The pivot ring pins 219 are both positioned in a plane perpendicular to the gland pins 222. When the seal face slots 216 are positioned with the pivot ring pins 219 the seal face 215 displaces in an angular manner about the axis of the two pivot ring pins. This gives the combined effect of having angular displacement about two axes perpendicular to each other and to the shaft axis, thus allowing full angular displacement of the seal face relative to the shaft axis in use.

Figure 11:
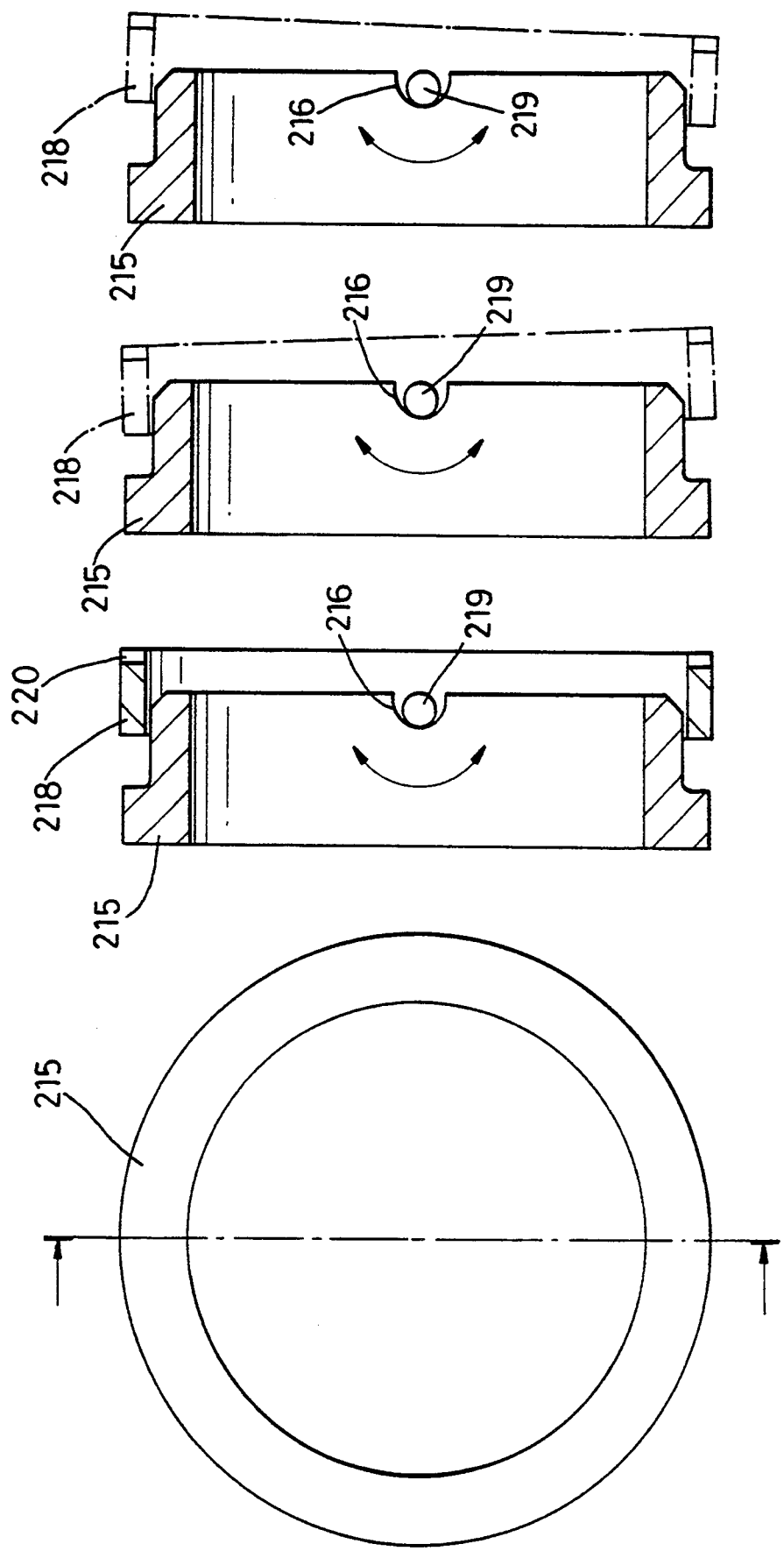
FIGS. 11 and 12 illustrate the operation of the self-aligning stationary component shown in FIGS. 9 and 10.
Figure 12:
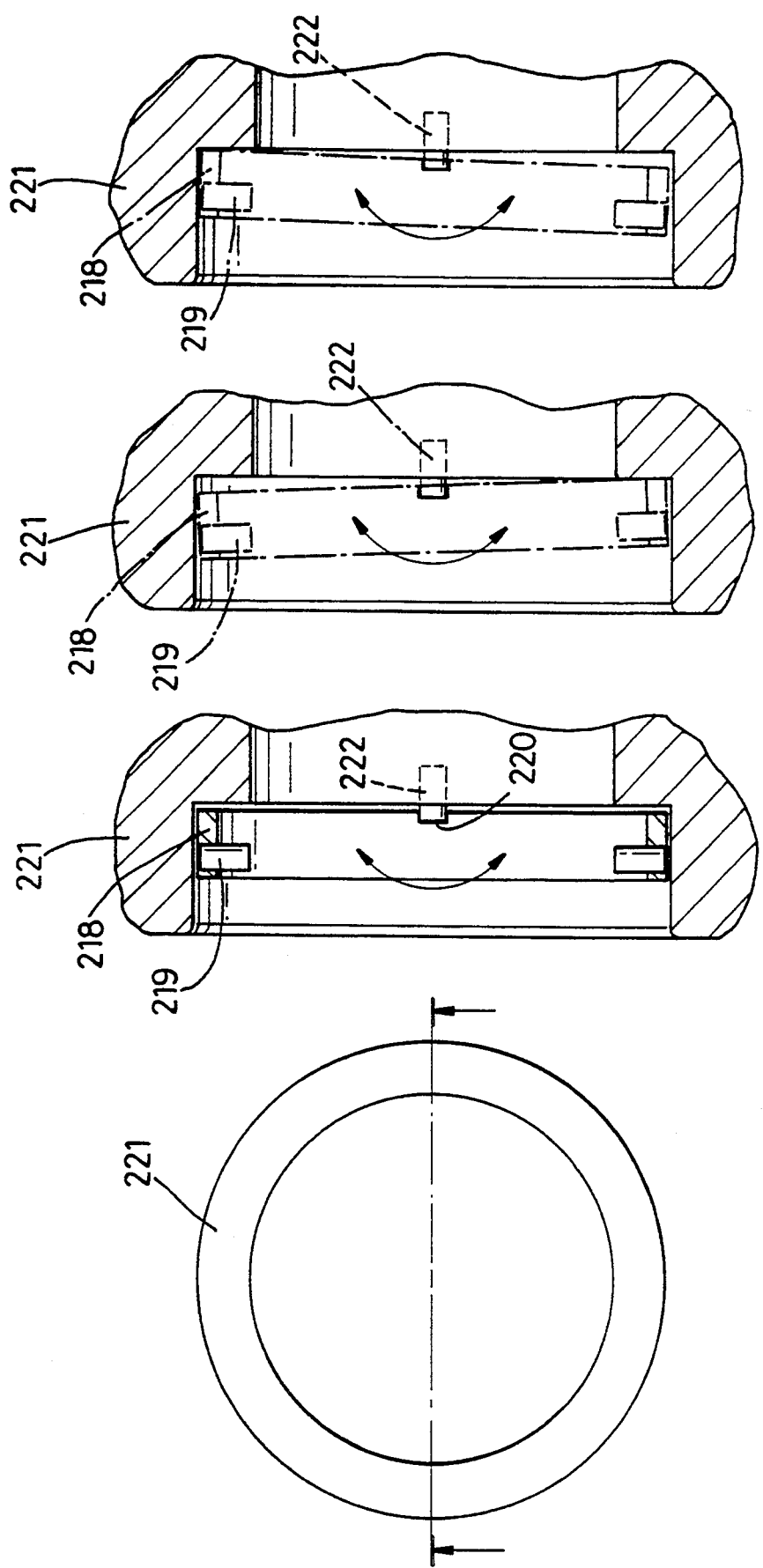

FIGS. 11 and 12 illustrate, by means of vertical and horizontal cross-sections respectively, the operation of the self-aligning-stationary component shown in FIGS. 9 and 10. The arrows illustrate the two modes of pivotal movement available to seal face 215 (shown in front view on the left hand side of each of the Figures).

FIG. 11 shows three stages of movement of seal face 215 relative to pivot ring 218, about primary pivot pins 219 located in correspondingly shaped slots 216 in the seal face. FIG. 12 shows three stages of movement of pivot ring 218 relative to gland plate 221, about secondary pivot pins 222 located in slots 220.

It can be seen from FIGS. 11 and 12 that the pivot ring 218 can partially rotate in two different planes:

(i) Pivot ring/gland (FIG. 12). The gland 221 has two pins 222 which protrude outwards from its front face. The pivot ring 218 has two clearance slots 220 machined into its back face which match the gland pins 222. When the two components are located together the pivot ring is able to rotate about the pin/slot by an amount governed by the clearance between the gland face and the pivot ring face.

(ii) Pivot ring/seal face (FIG. 11). The pivot ring has two pins 219 which protrude radially inwards from its inside diameter. The seal face 215 has two slots 216 in its back face which match the pivot ring pins. The pivot ring pins/seal face slots are positioned at 90° to the previously mentioned gland pins/pivot ring slots. When the two components are located together the pivot ring is able to rotate about the pin/slot by an amount governed by the clearance between the pivot ring inside diameter and the seal face sealing diameter.

A consequence of (i) and (ii) being at 90° to each other is that the seal face 215 is free to misalign in all directions due to the combined effects of its rotational freedom.

The USI component also has to act as a sealing device; its sealing operation is as follows. Primary sealing is obtained at the lapped (front) face of seal face 215, as is the case in conventional mechanical seals.

An 'O' ring 217 (or similar) is used as a secondary seal. Sealing is achieved by compressing the elastomeric 'O' ring in between an outside diameter on the seal face 215 (seal face sealing diameter) and an inside diameter on the gland housing (gland housing sealing bore). Due to the 'O' ring's elastomeric properties it deforms quite easily and therefore requires something to prevent it moving in an axial manner. In the design shown, the front face of the pivot ring 218 is utilised for this purpose. Traditionally 'O' rings are designed to fit into grooves, hence it should be pointed out that this design is an extension of this principle, i.e.

Shaft diameter = seal face sealing diameter
Groove diameter = gland housing sealing bore
Groove width = distance between pivot ring face and seal shoulder.

FIG. 13 shows how O-ring 217 is positioned in the component in use, in the space which exists between the seal face, the front face of the pivot ring and the gland plate. A groove for the O-ring does not have to be specially bored in the gland plate, which represents an advantage over other types of self-aligning stationary component because of its relative ease of production. It should be noted that the "USL" type of self-aligning stationary (see FIGS. 1, 3 and 7) has a groove specially bored in the gland plate to accommodate the stationary face O-ring.

Although both function according to the same basic principles and to achieve the same effect, there are a number of other advantages of the use of a "USI" type self-aligning stationary over the use of a "USL" type. The main one is that the seal face pin arrangement in the USL means that the seal face is only suitable to be constructed out of metals. Ceramic type materials tend to crack when pins are pressed into holes in their surfaces, due to the inherent brittleness of the materials. However, ceramic materials (such as, for instance, silicon carbide (SiC)) are widely preferred as seal face materials. SiC, for example, is a more thermally resistant, much harder and more widely chemically resistant seal face material than most metals.

Due to the pivot pin arrangement, a USL seal face has to be made from a metal, meaning that the only way a ceramic face can be supplied is by inserting a ceramic ring into a metal holder. However, inserted stationary faces are inferior to solid faces for a number of reasons:

1. Inserts have a built-in static leak path, between the insert and its holder, which must be sealed effectively.

2. Inserts and holders have different coefficients of thermal expansion, so that changes in temperature (the seal face will suffer large changes in temperature during use) can have adverse effects on component stresses, particularly due to shrink-fit interference where the two components have been shrunk-fit together, and can cause distortion of the seal face.

3. If the insert and the holder are not shrunk-fit together, other difficulties arise in their connection, for instance, the need to provide an anti-rotation pin linking the two components; and the need to provide an O-ring or similar seal between the insert and holder, which means that an O-ring groove must be machined into the holder and the holder diameter consequently increased. The latter problem leads to increased production costs; difficulties due to the location of a heat-sensitive O-ring directly adjacent a hot seal face; and decreased versatility of the component as a whole due to the increased size of the holder.

4. The heat transfer coefficient for a stationary face is generally low compared to that for a rotary face. It is therefore better if a stationary face is formed from a single solid material in which heat can build up without causing undue distortion.

Thus, a single material (preferably ceramic) stationary seal face is preferred. However, a ceramic seal face is generally less able to withstand stresses placed on it where a pivot ring pin is located in a bore in the seal face, as in the USL. On start-up of a seal incorporating such a seal face, its contact with the rotary seal face makes the stationary face tend to try to rotate with the rotary. It is prevented from doing so by the pivot pins abutting the walls of the bores in which they are located, but the sudden action of the pins on the bore walls can cause cracking in the brittle ceramic seal face. For this reason, the USL type of self-aligning stationary is unsuitable for use with solely ceramic seal faces.

In the USI type of self-aligning stationary, in contrast, the primary pivot pins are located in specially shaped slots in the seal face. Each pin is in contact with its respective slot walls at all times, not just on start-up of the seal, and there are no problems of breakage of the seal face during normal use.

A further advantage of the USI over the USL is that, due to its design, a generally larger cross-section O-ring can be used in the USI. This is partly because the O-ring groove is defined by the component parts themselves, including the front face of the pivot ring which in part encircles the seal face. The use of a larger O-ring is preferred because it is less likely to extrude (i.e., migrate) into a small clearance gap in the seal than is a smaller O-ring.

Various designs of cartridge seal, in accordance with the present invention, are now illustrated in FIGS. 14–19. In all these Figures, the reference number 148 refers to the seal sleeve; 151 to the rotary seal face and 153 to the stationary seal face; 155 to the stationary 'O' ring; 157 to the sleeve 'O' ring (which will contact the equipment shaft on which the seal is mounted); 161 to the gland plate of the seal; and 163 to a holder for the rotary face 151.

Figure 14:
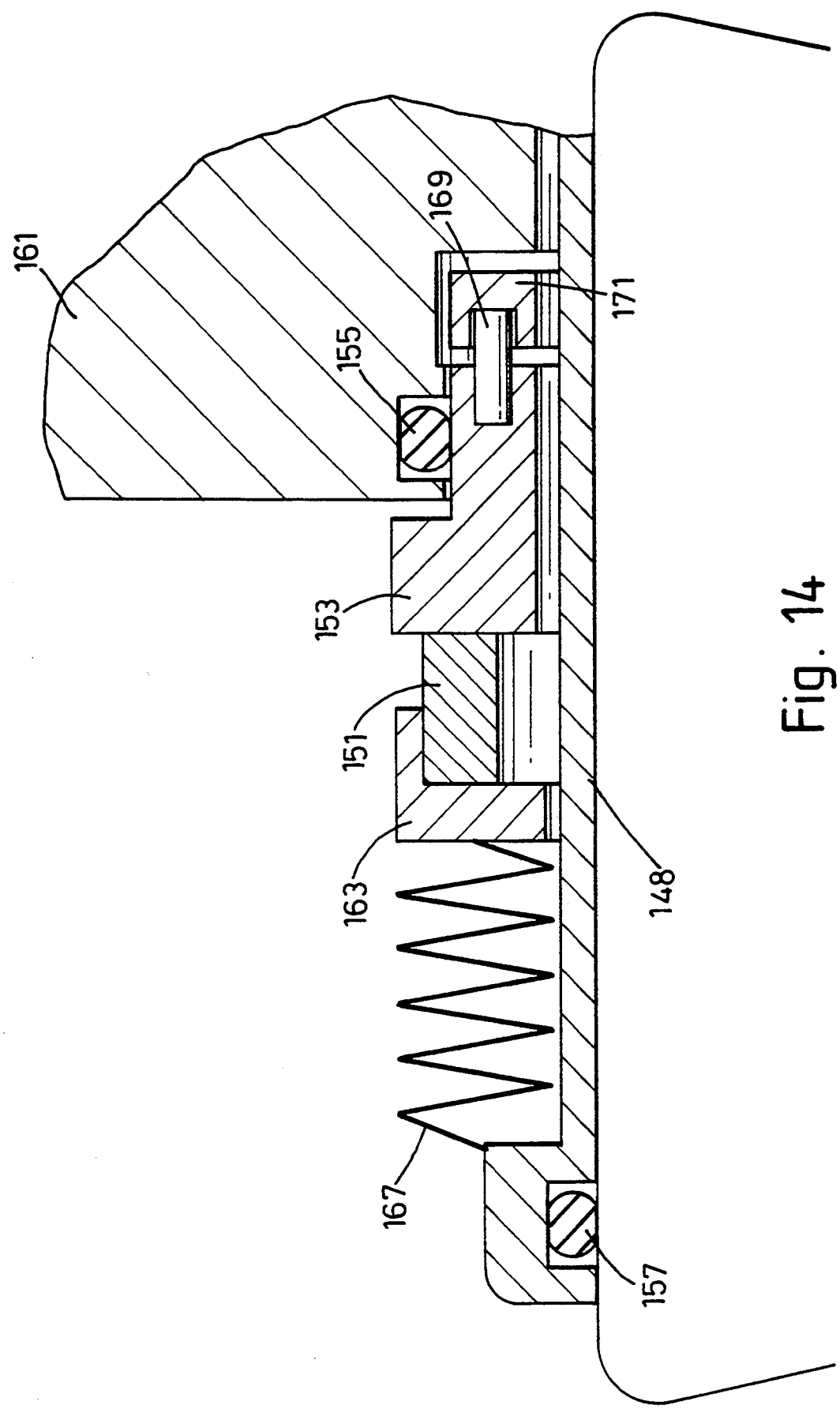

Referring firstly to FIG. 14, the seal shown is in accordance with the invention, having metal bellows 167 (of a suitable alloy) acting to urge rotary face 151 into mating contact with stationary face 153. The bellows 165 are welded directly to the rotary face holder 163 and to the seal sleeve 148.

The seal also incorporates a self-aligning stationary component of the "USL" type, stationary face 153 being mounted about primary pivot pins 169 set in pivot ring 171 which in turn is mounted about secondary pivot pins (not seen) set in gland plate 161.

Figure 15:
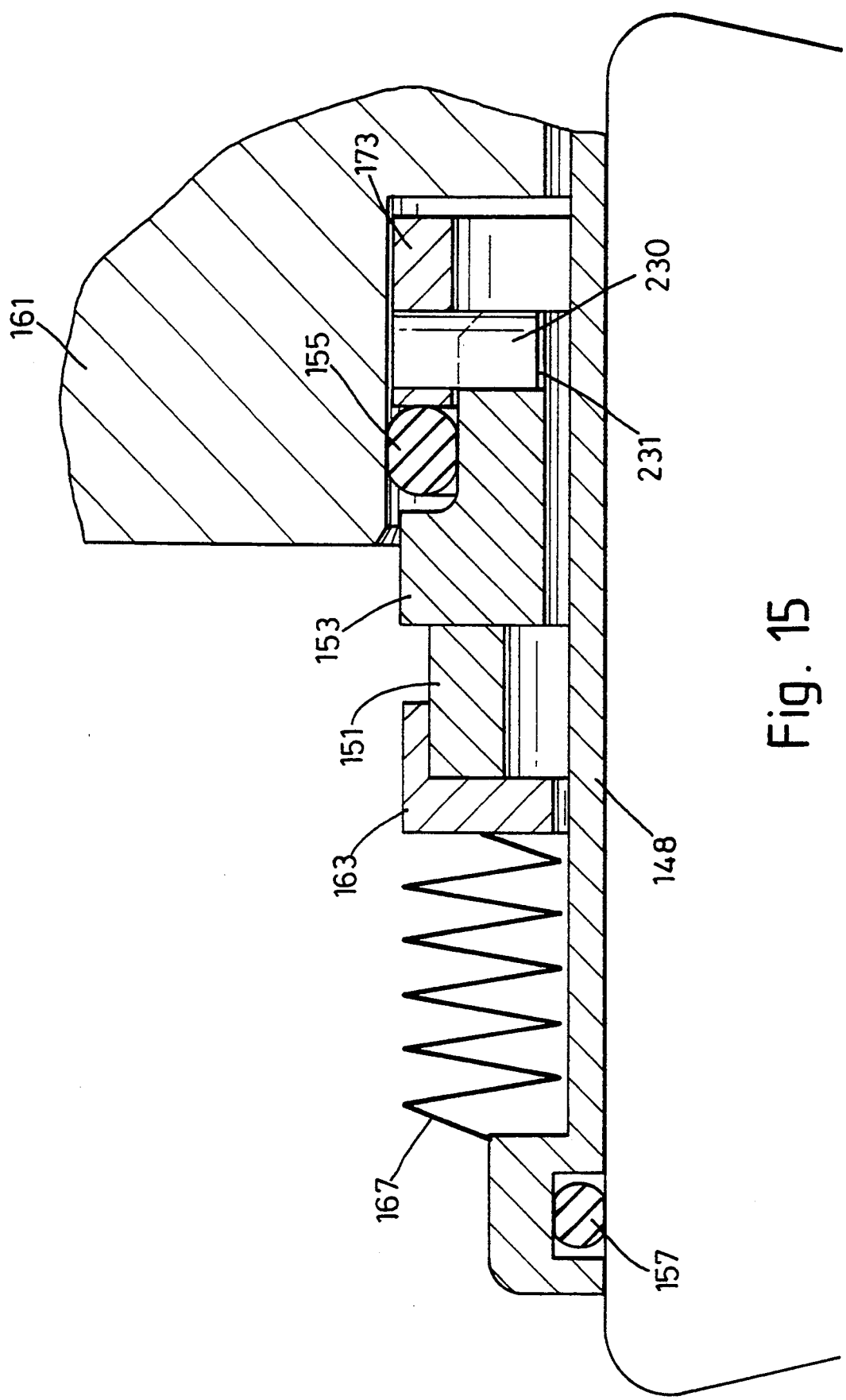

The seal shown in FIG. 15 is the same as that shown in FIG. 14, except that it incorporates a self-aligning stationary of the "USI" type, seal face 153 being mounted for pivotal movement about pivot pins 230 set in pivot ring 173 (in turn pivotally mounted in gland plate 161). The pivot pins 230 are located in slots 231 in the rear end of seal face 153.

Figure 16:
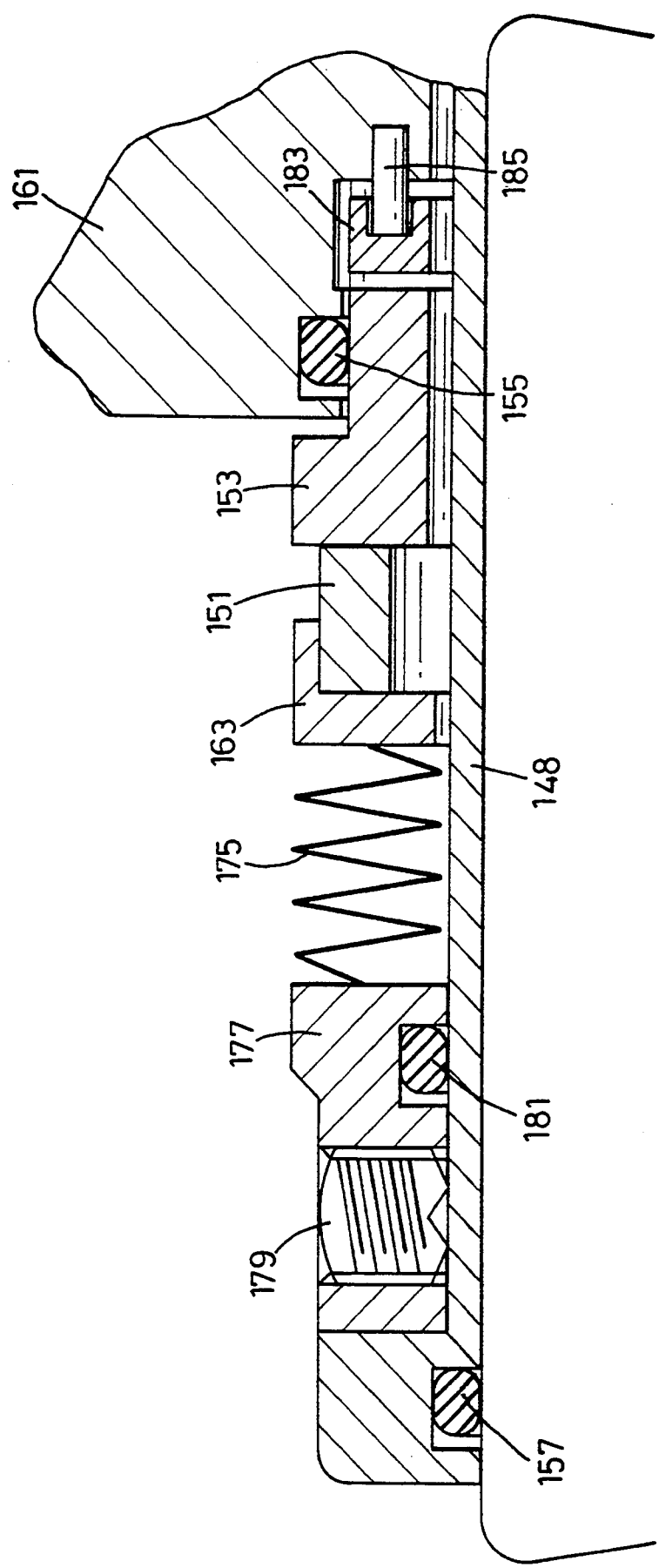

In FIG. 16, the seal illustrated has a self-aligning stationary of the "USL" type (pivot ring 183, secondary pivot pins 185, here shown at 90° to the self-aligning stationary component seen in FIG. 14) and metal bellows 175 welded to the rotary face holder 163. The bellows 175 form part of a bellows unit which also includes bellows holder 177 (welded to bellows 175) and 'O' ring 181. The bellows unit is secured to the seal sleeve 148 by means of grub screw 179.

Often, the bellows "core" (i.e., bellows 175 in FIG. 16), or the entire bellows unit, may be manufactured separately and post-fitted in a cartridge seal.

Figure 17:
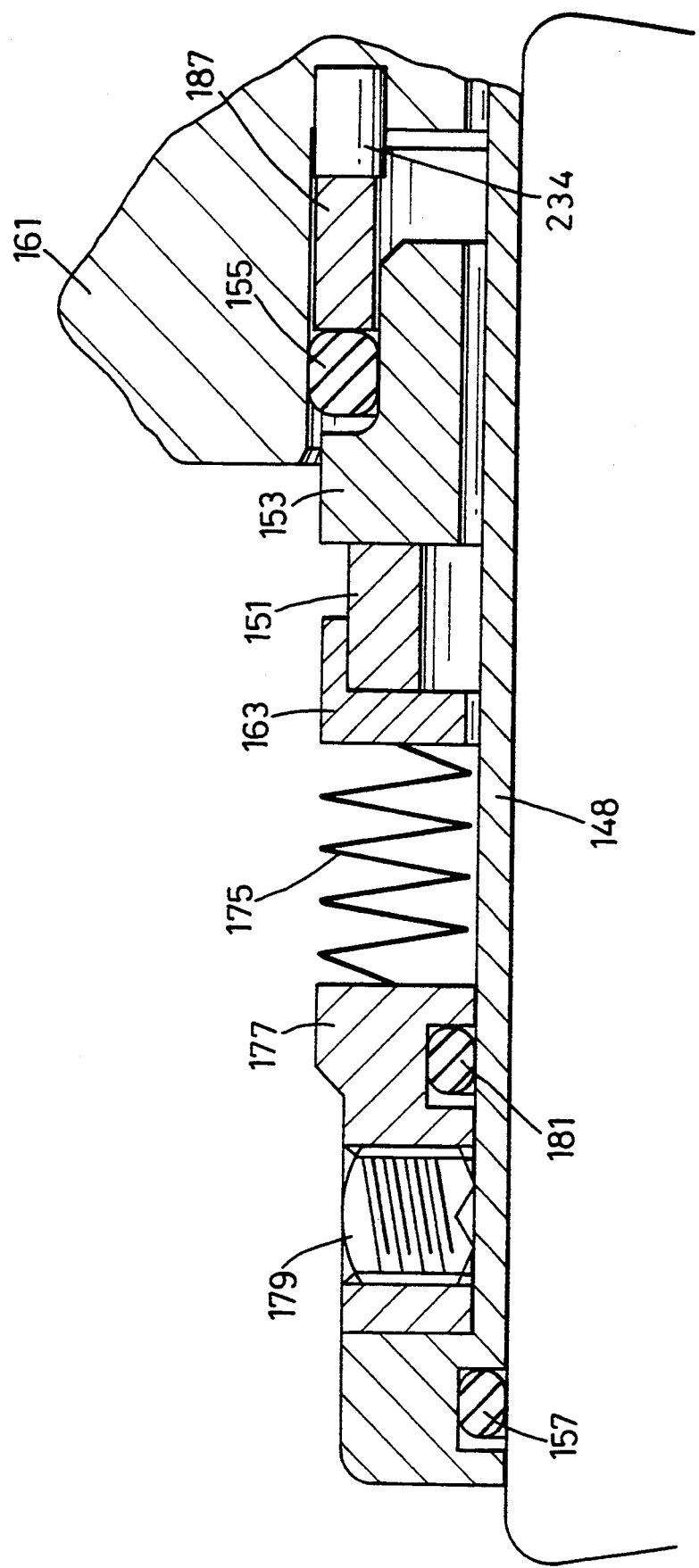

The seal shown in FIG. 17 is identical to that shown in FIG. 16, except that it incorporates a self-aligning stationary of the "USI" type (here shown at 90° to the self-aligning stationary seen in FIG. 15). 187 refers to the pivot ring and 234 to a secondary pivot pin, by means of which pivot ring 187 is mounted in the gland plate 161.

Figure 18:
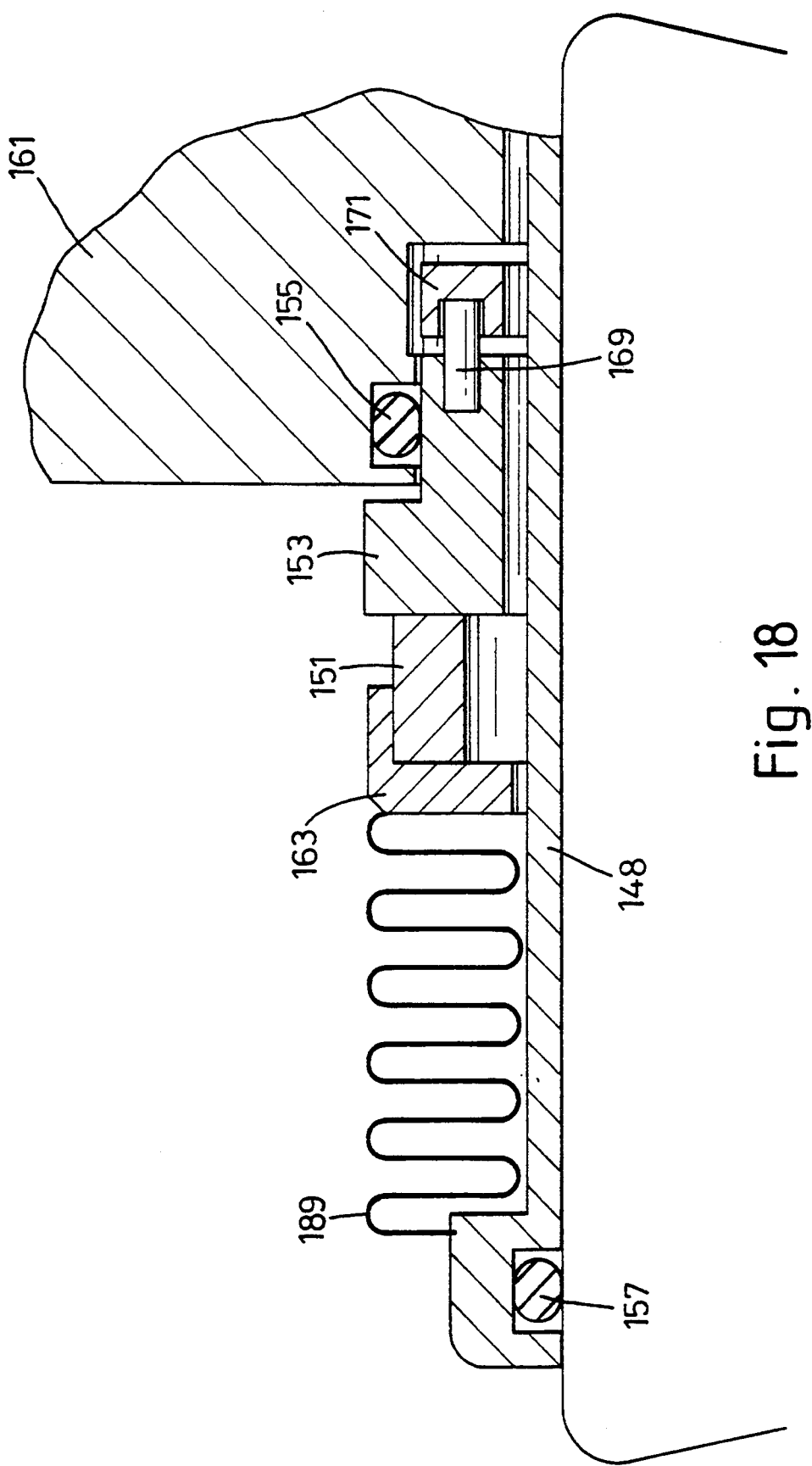

The seal shown in FIG. 18 has a pivot pin and ring 169 and 171 respectively, as in FIG. 14, and bellows 189 having a repeating U profile. The bellows core is welded directly to the sleeve 148 and the rotary holder 163. The U-shaped bellows are of the corrugated type, rather than the welded type as used in the seals of FIGS. 14–17. These are typically easier to make, and less prone to fatigue, than bellows of the welded type.

Figure 19:
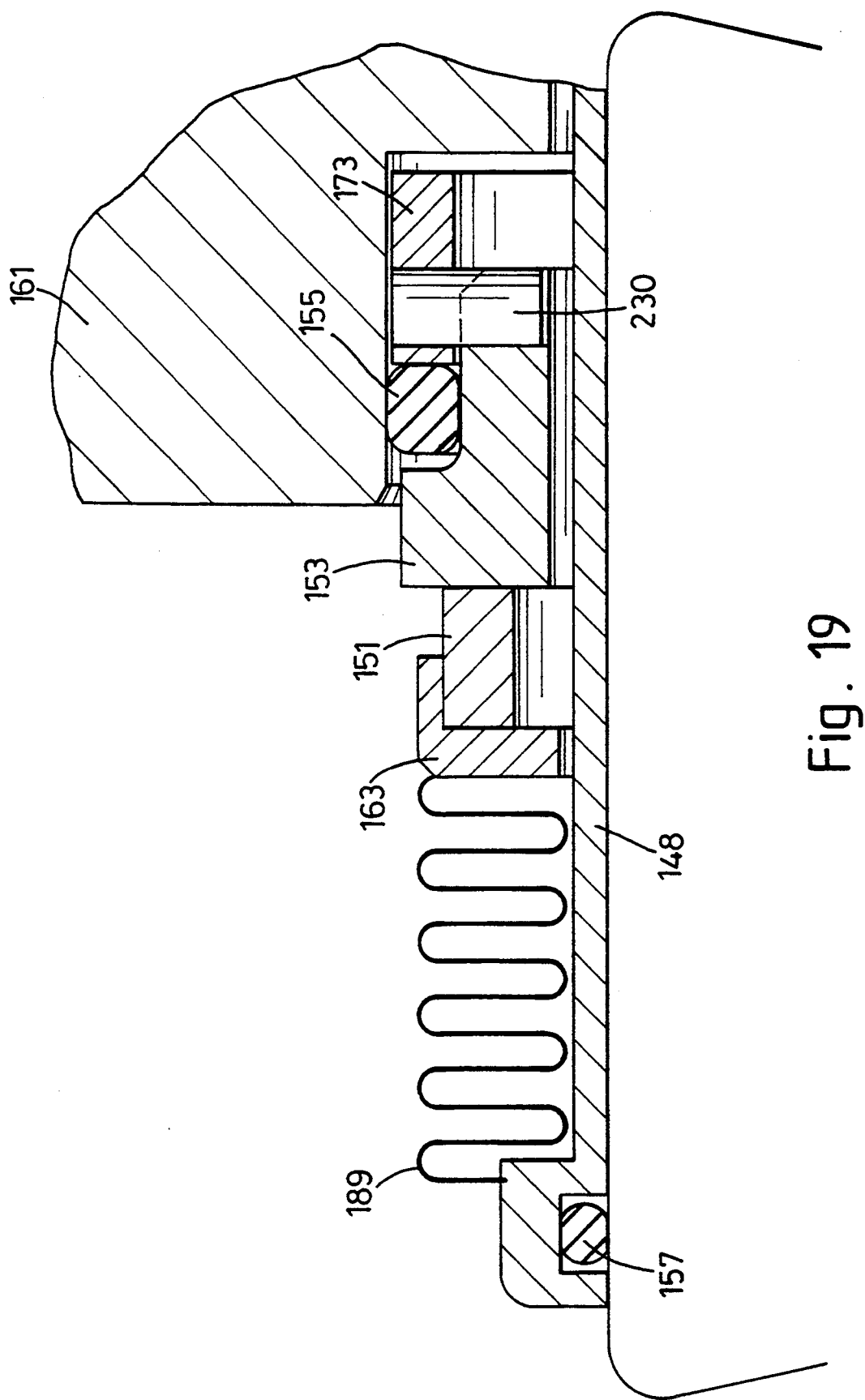
Figure 22:
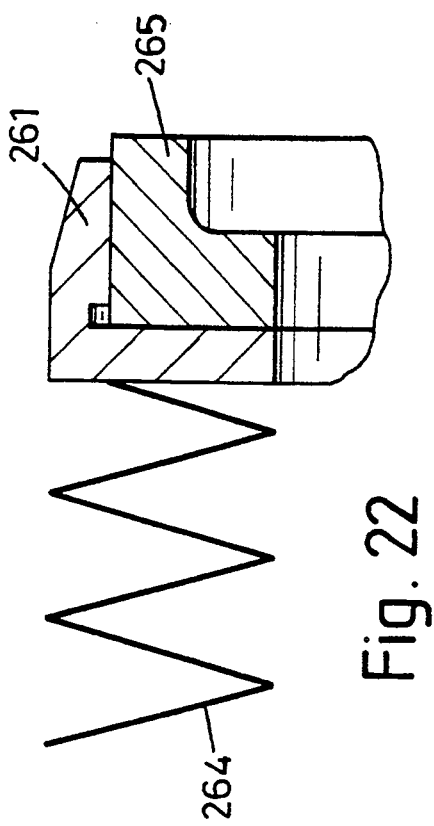
Figure 24:
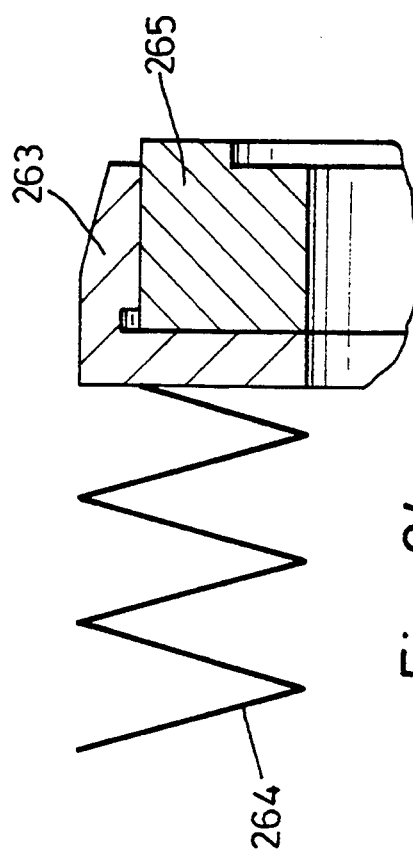
Figure 21:
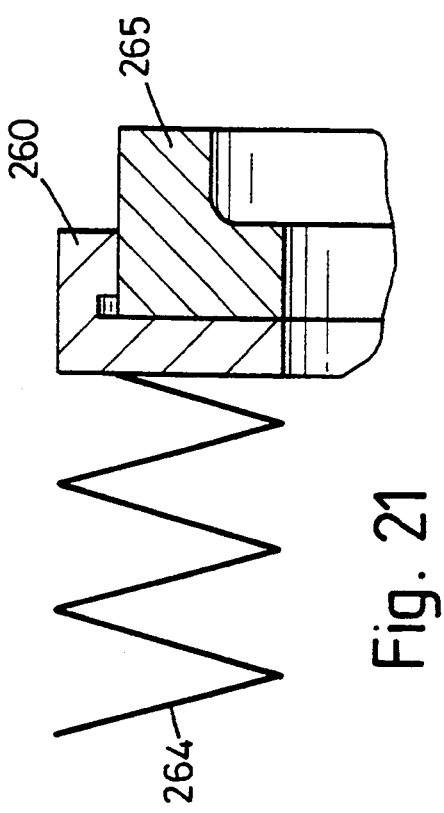
Figure 23:
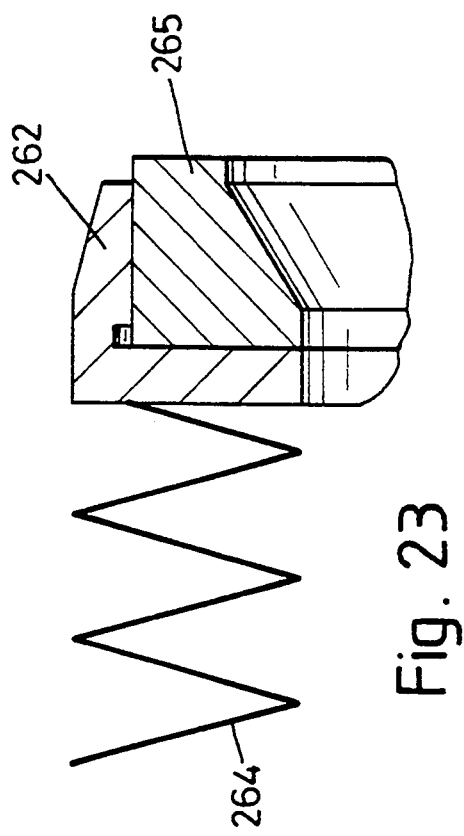

The seal shown in FIG. 19 is the same as that shown in FIG. 18, except that it has a "USI" type self-aligning stationary, as that shown in FIG. 15 (with corresponding reference numerals for the pivot pin and ring).

Where metal bellows are provided as a complete bellows unit, this typically takes the form shown in FIG. 20. The unit shown comprises a (welded) metal bellows core 250, welded to a "drive end" 251 and a "face end" 252. In use of the unit as part of a mechanical seal, the face end 252 is mounted on the rotary seal face (253 in FIG. 20) and the drive end 251 is grub screwed (drive screw 254) onto the cartridge or sleeve (255) of the seal.

Alternatively, bellow may be provided simply as a bellows core, which a user welds to his own drive and face ends. FIGS. 21-24 show various possible designs for face ends 260-263 respectively, to which bellows core 264 may be welded. 265 is the seal face on which the face end is mounted in use in each case.

However, bellows cores are expensive to produce due to relatively high tooling costs. Hence, not many companies have this facility. To a certain extent this makes the bellows cores "conventional designs", due to the scarcity of cores producers.

The considerations which have to be borne in mind when constructing a mechanical seal incorporating a bellows are as follows.

Despite being somewhat prone to fatigue, metal bellows seals are generally regarded as being the preferred seal constructional type for thermal sealing duties. This is mainly due to the absence of a sliding elastomeric seal (i.e., "O" ring or similar) in the metal bellows seal design. The only secondary seals required in a metal bellows seal design are static seals which are totally unaffected by seal face wear or elastomeric thermal expansion, which causes hang up on conventional pusher type seals, hence limiting the use of pusher type seals for thermal duties.

Consideration should also, and equally, be given to the mating face used in conjunction with the metal bellows. Naturally enough, the counterface should be selected for the same reasons as the metal bellows unit. On thermal sealing duties the mating face should be of solid construction, and not of a plated or inserted design, such designs being prone to distort due to the different thermal expansion rates of the dis-similar materials. For similar reasons, clamped counterface designs are not normally selected for thermal duties (despite being of solid construction) due to clamping load variation due to differential expansion rates of the pump body, gaskets, face material, gland plates and studs.

Materials used for the counterface also have a major influence on thermal performance. Ideally, it should be relatively hard, have good (i.e., high) thermal conductivity and low thermal expansion. One material that fails into this specification is silicon carbide, which is now widely accepted as a high performance seal face material. Probably the only limitation in the use of silicon carbide is due to its brittleness, which can cause cracking and other damage associated with localised mechanical loading. On mechanical seal faces, typical regions affected by this type of loading are anti-rotation or drive mechanisms.

Despite its brittleness, provided that the effects of mechanical shock loads can be reduced (i.e., on equipment startup) silicon carbide is probably the best generally available seal face material for thermal duties. It also has excellent chemical resistance to most products and would therefore be an obvious choice where seal selection is made for chemical attack reasons.

We claim:

1. A cartridge-mounted mechanical seal comprising a sleeve on which are mounted a rotary and a stationary component, having adjacent faces, and bellows acting against the rotary component to urge the rotary component face into mating contact with the stationary component face, wherein the stationary component of the seal is pivotally mounted about a first axis perpendicular to the longitudinal axis of the seal on at least one primary pivot pin, set in a pivot ring which is in turn pivotally mounted about a second axis perpendicular to the longitudinal axis of the seal with respect to a fixed part of the seal which, in use, remains fixed in equipment in which the seal is used, the arrangement allowing a degree of pivotal movement, when the seal is in use, of the stationary component relative to the pivot ring about the at least one primary pivot and a degree of pivotal movement of the pivot ring relative to the stationary parts of the item of equipment and hence maintaining the stationary and rotary components of the seal substantially in alignment despite any out-of-squareness in the equipment, wherein the said at least one primary pivot is located in at least one respective slot provided in the stationary component and enters the slot in a radial direction, at least part of the pivot ring encircling at least part of the outside diameter of the stationary component.

2. A seal according to claim 1, wherein the bellows are of a welded construction.

3. A seal according to claim 1, wherein the bellows are of a corrugated construction.

4. A seal according to claim 1, wherein the bellows are made from a metal or metal alloy having a relatively high chemical resistance.

5. A seal according to claim 4, wherein the bellows are made from stainless steel.

6. A seal according to claim 1, wherein the core of the bellows is welded to the rotary component of the seal.

7. A seal according to claim 1, wherein at its end remote from the rotary component of the seal, the core of the bellows is welded directly to the seal sleeve at an appropriate point towards the product end of the seal.

8. A seal according to claim 1, wherein the bellows form part of a bellows unit comprising a bellows holder to which the bellows core is welded, the holder in turn being secured to the seal sleeve.

9. A seal according to claim 1, wherein the pivot ring is mounted about at least one secondary pivot pin set in the fixed part of the seal.

10. A seal according to claim 9, wherein the arrangement of the stationary component and pivot ring, relative to the fixed part of the seal in which the secondary pivot pins are set, is such that an O-ring sealing element may be accommodated, and held in position, in a cavity defined by the stationary component, the pivot ring and the fixed part of the seal, so that the sealing element acts, to seal the join between the stationary component and the fixed part of the seal.

11. A seal according to claim 1, wherein the sleeve is made of stainless steel.

12. A seal according to claim 1, wherein the stationary component face is made from a ceramic material.

13. A seal according to claim 12, wherein the stationary component face is made from silicon carbide.

14. A seal according to claim 1, additionally comprising an integral gland plate for connection to the casing of equipment in which the seal is to be used.

15. A self-aligning-stationary unit for use in a cartridge-mounted mechanical seal, the unit comprising a stationary seal face pivotally mounted about at least one primary pivot pin set in a pivot ring, the pivot ring in turn being pivotally mounted with respect to a gland plate which, in use of a seal incorporating the unit in an item of equipment, will remain fixed in position relative to stationary parts of the equipment, wherein the at least one primary pivot pin is located in at least one respective slot provided in the stationary seal face and enters the slot in a radial direction, at least part of the pivot ring encircling at least part of the outside diameter of the stationary seal face.

16. A self-aligning stationary unit according to claim 15, comprising two primary pivot pins, spaced by 180° circumferentially from one another.

17. A self-aligning stationary unit according to claim 16, wherein the pivot ring is pivotally mounted about at least one secondary pivot pin set in the gland plate.

18. A self-aligning stationary unit according to claim 17, comprising two secondary pivot pins, spaced by 180° circumferentially from one another.

19. A self-aligning stationary unit according to claim 12, wherein each of the secondary pivot pins is spaced by 90° circumferentially from a respective primary pivot pins, in use.

20. A self-aligning stationary unit according to claim 15, wherein the arrangement of the stationary seal face and pivot ring, relative to the gland plate, is such that an O-ring sealing element may be accommodated, and held in position, in a cavity defined by the stationary seal face, the pivot ring and the gland plate, so that the sealing element acts to seal the join between the stationary seal face and the gland plate.

21. A self-aligning stationary unit according to claim 15, wherein the stationary seal face is made at least partly from a ceramic material.

22. A self-aligning stationary unit according to claim 21, wherein the stationary seal face is made entirely from a ceramic material.

23. A self-aligning stationary unit according to claim 21, wherein the ceramic material is silicon carbide.

24. A cartridge-mounted mechanical seal, comprising a sleeve on which is mounted a rotary and a stationary component, having adjacent faces, and bellows acting against the rotary component for urging the rotary component face into mating contact with the stationary component face, wherein the stationary component of the seal is pivotally mounted about a first axis perpendicular to the longitudinal axis of the seal on at least one primary pivot pin, set in a pivot ring which is in turn pivotally mounted about a second axis perpendicular to the longitudinal axis of the seal with respect to a fixed part of the seal which, in use, remains fixed in position relative to the stationary parts of an item of equipment in which the seal is used, the arrangement allowing a degree of pivotal movement, when the seal is in use, of the stationary component relative to the pivot ring about the at least one primary pivot pin and a degree of pivotal movement of the pivot ring relative to the stationary parts of the item of equipment and thereby maintaining the stationary and rotary components of the seal substantially in alignment despite any out-of-squareness in the equipment, wherein the arrangement of the stationary component and pivot ring, relative to the fixed part of the seal, is such that an O-ring sealing element is able to be accommodated, and held in position, in a cavity defined by the stationary component, the pivot ring and the fixed part of the seal, so that the sealing element acts to seal the join between the stationary component and the fixed part of the seal.

25. A self-aligning-stationary unit for use in a cartridge-mounted mechanical seal, the unit comprising a stationary seal face pivotally mounted about, at least one primary pivot pin set in a pivot ring, the pivot ring in turn being pivotally mounted with respect to a gland plate which, in use of a seal incorporating the unit in an item of equipment, will remain fixed in position relative to stationary parts of the equipment, wherein the arrangement of the stationary seal face and pivot ring, relative to the gland plate, is such that an O-ring sealing element is able to be accommodated, and held in position, in a cavity defined by the stationary seal face, the pivot ring and the gland plate, so that the sealing element acts to seal the join between the stationary seal face and the gland plate.

* * * * *